(12) United States Patent
Sierra et al.

(10) Patent No.: US 10,019,778 B2
(45) Date of Patent: Jul. 10, 2018

(54) SYSTEMS AND METHODS FOR ORCHESTRATING EXTERNAL GRAPHICS

(71) Applicant: Dell Products L.P., Round Rock, TX (US)

(72) Inventors: Danae Sierra, Miami, FL (US); Carlos L. Ross, Miami, FL (US); Louis Bruno, Austin, TX (US); Philip J. Grossmann, Austin, TX (US); Mark A. Casparian, Miami, FL (US); Joe A. Olmsted, Austin, TX (US); Alexander Galiano, Miami Beach, FL (US); Amaury Brito Alvarez, Miami, FL (US); Henry A. Bove, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/389,491

(22) Filed: Dec. 23, 2016

(65) Prior Publication Data

US 2017/0103495 A1     Apr. 13, 2017

Related U.S. Application Data

(63) Continuation of application No. 14/523,547, filed on Oct. 24, 2014, now Pat. No. 9,558,527.

(51) Int. Cl.
| | |
|---|---|
| *G06F 15/16* | (2006.01) |
| *G06T 1/20* | (2006.01) |
| *G06F 1/16* | (2006.01) |
| *G06F 3/14* | (2006.01) |

(52) U.S. Cl.
CPC .............. *G06T 1/20* (2013.01); *G06F 1/1632* (2013.01); *G06F 3/1438* (2013.01)

(58) Field of Classification Search
CPC .. G09G 5/363; G09G 2360/06; G06F 1/1632; G06F 3/14; G06F 3/1438; G06F 1/325; G06F 13/4081
See application file for complete search history.

(56) References Cited

U.S. PATENT DOCUMENTS

| | | | |
|---|---|---|---|
| 7,772,987 | B2 | 8/2010 | Shows |
| 7,982,742 | B2 | 7/2011 | Casparian et al. |
| 8,319,782 | B2 | 11/2012 | Casparian et al. |
| 8,411,029 | B2 | 4/2013 | Casparian et al. |
| 8,700,829 | B2 | 4/2014 | Casparian et al. |
| 9,111,005 | B1 | 8/2015 | Ross et al. |
| 2013/0120409 | A1 | 5/2013 | Iwase et al. |

(Continued)

OTHER PUBLICATIONS

Acer Launches DynaVivid Graphics Dock for the Acer Ferrari One, Printed from Internet Oct. 14, 2014, 3 pgs.

(Continued)

*Primary Examiner* — Hau H Nguyen
(74) *Attorney, Agent, or Firm* — Egan Peterman Enders Hutson

(57) ABSTRACT

Systems and methods that may be implemented to orchestrate external graphics, for example to support and extend switchable graphics capability beyond internal system components of a host information handling system so as to include an external discrete graphics processing unit (xGPU) that is not integrated or embedded within the chassis enclosure of the host information handling system, and that is coupled to the host information handling system from outside the host system chassis enclosure.

22 Claims, 17 Drawing Sheets

(56) References Cited

U.S. PATENT DOCUMENTS

2014/0281618 A1  9/2014  Sultenfuss et al.
2015/0061901 A1  3/2015  Casparian et al.
2015/0196844 A1  7/2015  Liendo et al.
2016/0117793 A1  4/2016  Sierra et al.

OTHER PUBLICATIONS

Sony Vaio Z Notebook With External GPU, Printed from Internet Oct. 14, 2014, 8 pgs.
Ultra-Mobile Vaio Z With Power Media Dock Now Official, Printed from Internet Oct. 14, 2014, 3 pgs.
ATI XGP From AMD-Desktop-class Graphics for Notebook Garners, Printed from Internet Oct. 14, 2014, 2 pgs.
Sony Vaio Z Series Laptop Boasts External Graphics and Thunderbolt Tech, Printed from Internet Oct. 22, 2014, 3 pgs.
Nvidia Switchable Graphics Adapters vs Nvidia Optimus Graphics Adapters-Thinkpad T410S, W510, Printed from Internet Oct. 22, 2014, 5 pgs.
Switchable Graphics on Notebooks Configured With Intel and ATI GPUs, Printed from Internet Oct. 14, 2014, 4 pgs.

SYSTEMS AND METHODS FOR ORCHESTRATING EXTERNAL GRAPHICS

This application is a continuation of U.S. patent application Ser. No. 14/523,547, filed on Oct. 24, 2014 and entitled "Systems And Methods For Orchestrating External Graphics" which is incorporated herein by reference in its entirety for all purposes.

FIELD OF THE INVENTION

This application relates to graphics and, more particularly, to external graphics for information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Notebook computers have been provided with two internal graphics processing units (GPUs)—a power saving but lower performance internal integrated GPU (iGPU), and a higher performance (but less power efficient) internal discrete GPU (dGPU). The internal iGPU is integrated within the host CPU inside the notebook computer chassis enclosure, and the internal discrete GPU is provided inside the enclosure of a notebook computer chassis and coupled to the host CPU using an internal data bus. The internal discrete GPU consumes more power than the internal iGPU but also provides higher 3D performances as needed for game play. "Switchable graphics" refers to a technology that allows a user to select between the internal integrated GPU and the internal discrete GPU of a notebook computer based on the graphics processing required by an application that is currently executing on the information handling system. The intent of switchable graphics is to provide users longer battery times when no high-performance graphics are needed.

Switchable graphics technology has been implemented using switchable graphics drivers executing on the host CPU within the notebook computer chassis enclosure to provide users the choice of low power graphics (internal iGPU for low power draw) or high performance graphics (internal dGPU for gaming). This allows a notebook computer user to extend notebook computer battery life by allowing the user to select to use the lower power internal integrated GPU for more mundane graphics processing applications, and to enable the higher performance and higher power consuming internal discrete GPU only for applications with demanding graphics processing requirements such as gaming applications. Examples of available switchable graphics technology include Nvidia Optimus technology and AMD Power Express technology. While some switchable graphics implementations require a system reboot to switch between the internal discrete GPU and the internal integrated GPU, switchable graphics drivers have been developed that allow a user to switch between the internal discrete GPU and the internal integrated GPU without system reboot. Switchable graphics software has also been developed that allows users to configure their system to auto-switch from one internal GPU to the other internal GPU in a manner that is transparent to the user. Windows 7/8.1 operating system supports switchable graphics.

An external graphics dock for notebook computers has been developed that includes components external to the notebook computer chassis that connect to internal circuitry inside the notebook computer chassis enclosure via two cables that carry PCI-e 3.0 signals. This external graphics dock includes an external full length (PCI-E Gen 3.0×8 lanes) desktop graphics card coupled to the external dock. Another external graphics dock has been proposed that connects to with a notebook computer via an Expresscard socket, and supports two independent streams—one from the notebook via a pass-thru port on the external dock, and one from the external GPU that is coupled to the dock.

SUMMARY OF THE INVENTION

Systems and methods are disclosed herein that may be implemented in one embodiment to enable switchable graphics capability to be supported and extended beyond internal system components of a host information handling system (e.g., such as a notebook computer) to include an external discrete graphics processing unit (xGPU) that is not integrated or embedded within the chassis enclosure of the host information handling system, and that is coupled to the host information handling system from outside the host system chassis enclosure. The disclosed systems and methods may be employed in one embodiment to allow graphics performance to be upgraded from the internal GPU components of the information handling system using switchable graphics and external discrete graphics card/s, e.g., without changing internal hardware configuration within the chassis of the information handling system. In a further exemplary embodiment, systems and methods may be implemented by an information handling system that enable automatic orchestration of connection and disconnection procedures (e.g., docking and undocking) for an external discrete GPU, e.g.,. on auto-pilot without requiring user coordination of same.

In one exemplary embodiment, an external graphics dock system may be provided that is configured to be operably coupled to one or more external discrete GPUs (xGPUs) and to be coupled to internal processing components (e.g., embedded controller/s, CPU/s, etc.) within an information handling system chassis enclosure by switchable graphics technology (e.g., software and/or firmware) executing on internal processing device/s (e.g., CPU, controller, microcontroller, etc.) of the information handling system. In one example, the switchable graphics features may be implemented by one or more processing devices in a manner that allows an external dGPU (xGPU) that is coupled to the external dock system to be utilized as a discrete GPU in switchable graphics mode while any internal discrete GPU (I-dGPU) that is installed and coupled within the information handling system is disabled from operation. Such a capability may be advantageously implemented in one embodiment to allow a higher performance desktop computer xGPU card (e.g., such as full size desktop GPU card) to be coupled to internal processing devices of a notebook computer and to be utilized externally for graphics processing in order to achieve superior graphics performance as compared to performance possible with an internal mobile GPU having a mobile I-dGPU, and without requiring power from the notebook computer to operate the xGPU, e.g., the power consumption of the xGPU may exceed the available power supply capacity of the notebook computer for powering a discrete GPU. In one example, a notebook computer enabled with switchable graphics and having an installed internal discrete mobile GPU may be coupled to an external dock system having an installed discrete desktop GPU card that may be operated by the switchable graphics mode in place of the internal mobile GPU while the external dock system is operably coupled to the notebook computer.

In various exemplary embodiments, the disclosed systems and methods may be advantageously implemented to achieve one or more features alone or in any combination with each other. These features include, but are not limited to, enabling switchable graphics technology operating within a host portable information handling system (e.g., notebook computer) to recognize and utilize a desktop discrete GPU while system is operating in a mobile oriented switchable graphics mode, providing a safe and reliable way to disconnect an external dock system having a discrete GPU from a connected host notebook computer or other information handling system without causing a system hang or blue screen of death (BSOD), allowing "surprise" connection (plug) and/or "surprise" disconnection (unplug) of an external dock system with discrete GPU to or from an operating host information handling system without requiring the information handling system to restart or be shutdown, providing software or other logic that executes in a manner that is invisible to the user and that prompts the user with decision tasks (i.e., button press options, etc.) and/or status updates (i.e., "your system is now connected", etc.) through the undocking and docking processes so as to guide the user through the docking and undocking processes in a manner that reassures and validates to the user that the docking or undocking operation is happening as desired and in a way that ensures the integrity of the desired signature experience, etc.

In one embodiment, features of the disclosed systems and methods may be implemented using an external graphics system (e.g., external graphics docking station) to orchestrate host system basic input/output system (BIOS), host system graphics drivers and a host system operating system (OS) so that these components work cooperatively together to extend host switchable graphics capability to external GPUs of the external graphics system. In a further embodiment, such external graphics orchestration may be implemented to allow a user to implement multiple graphics modes for a host information handling system. Examples of such modes include, but are not limited to, a default graphics mode in which the external graphics system is not configured and all switchable graphics video content for the host system is sourced from internal (e.g., factory installed) graphics components of the host information handling system, such as internal iGPU and internal dGPU. In a mobile graphics mode, a user may have coupled and configured an external dGPU of a coupled external graphics system for use with host system switchable graphics, but may disconnect the external system as desired, in which case switchable graphics video capabilities revert back to the default mode (i.e., internal iGPU and internal dGPU are active). In a single source mode, a user may have coupled and configured an external graphics system with a dual-GPU external dGPU card, in which case both the internal iGPU and internal dGPU may be disabled. In this mode, components of the external graphics system become the only source of video output, capable of driving multiple external displays according to the external dGPU card capabilities. In a dual source mode, the user may have coupled and configured an external graphics system with a single-GPU external dGPU card, in which case the internal dGPU is disabled, and both internal iGPU and external dGPU provide video output simultaneously.

In one respect, disclosed herein is a method of orchestrating external graphics for an information handling system, including operating multiple internal graphics components of a host information handling system in simultaneous on condition to display video on at least one integrated display device or first external display device coupled to a host processing device of the host information handling system, the multiple internal graphics components of the information handling system including an integrated graphics processing unit (iGPU) of the host processing device and an internal discrete graphics processing unit (I-dGPU) coupled to the host processing device. The method may further include using the host processing device of the host information handling system to execute an operating system (OS) system and system BIOS of the information handling system; using the host processing device of the host information handling system to execute the system BIOS to detect the presence of an external graphics card (xGPU) of an external docking system temporarily coupled in signal communication with the host information handling system, the xGPU card including at least one external GPU. The method may further include using the host processing device of the host information handling system to execute the system BIOS to perform the following steps only after detection of the connected xGPU card: turning off the I-dGPU of the host information handling system, leaving on or turning on the iGPU of the host information handling system, and turning on the xGPU card of the external docking system. The method may further include: using the host processing device to load graphics drivers for the iGPU and the xGPU card only after detecting the presence of the xGPU card connected to the host information handling system; and then operating the iGPU and the xGPU card in simultaneous on condition to display video on at least one of the integrated display device, first external display device, or at least one second external display device coupled to the external docking system.

In another respect, disclosed herein is an information handling system, including: a host processing device configured to execute a host operating system (OS) and a system BIOS of the information handling system; at least one integrated display device or first external display device coupled to the host processing device; multiple internal graphics components including an integrated graphics processing unit (iGPU) of the host processing device and an internal discrete graphics processing unit (I-dGPU) coupled to the host processing device, the multiple internal graphics components being coupled to the at least one integrated display device or first external display device and being configured to operate in a simultaneous on condition to display video on the at least one integrated display device or first external display device. The host processing device of the host information handling system may be configured to execute the system BIOS to detect the presence of an external graphics card (xGPU) of an external docking system temporarily coupled in signal communication with the host information handling system, the xGPU card including at least one external GPU. The host processing device of the host information handling system may be further configured to execute the system BIOS to perform the following steps only after detection of the connected xGPU card: turning off the I-dGPU of the host information handling system, leaving on or turning on the iGPU of the host information handling system, and turning on the xGPU card of the external docking system. The host processing device may be further configured to load graphics drivers for the iGPU and the xGPU card only after detecting the presence of the xGPU card connected to the host information handling system; and the information handling system may be configured to then operate the iGPU and the xGPU card in simultaneous on condition to display video on at least one of the integrated display device, first external display device, or at least one second external display device coupled to the external docking system.

DESCRIPTION OF ILLUSTRATIVE EMBODIMENTS

Figure 1A:
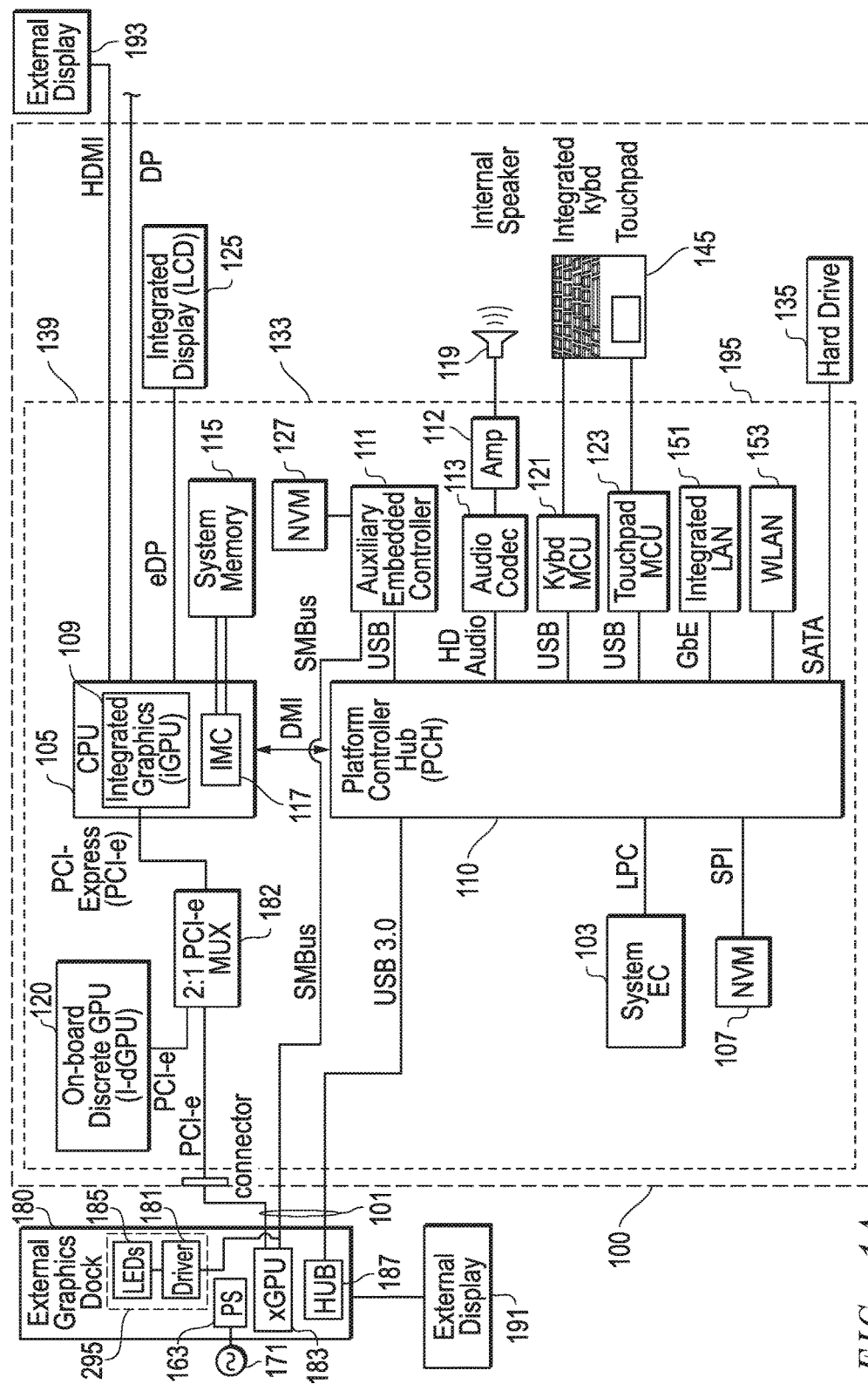
FIG. 1A illustrates a block diagram of an information handling system coupled to external components according to one exemplary embodiment of the disclosed systems and methods.

FIG. 1A is a block diagram of an information handling system 100 coupled to external components according to one exemplary embodiment of the disclosed systems and methods. Information handling system 100 may be, for example, a portable information handling system such as a notebook or laptop computer having a chassis enclosure delineated by the outer dashed outline. However, it will be understood that the disclosed systems and methods may be implemented in other embodiments for other types of information handling systems, such as a desktop computer, server, etc. As shown in FIG. 1A, information handling system 100 of this exemplary embodiment includes various components that are embedded on a system motherboard 139, it being understood that any one or more of such embedded components may be alternatively provided separate from motherboard 139 within chassis case of information handling system 100, e.g., such as provided on a daughter card or other separate mounting configuration.

Still referring to FIG. 1A, information handling system includes a host processing device 105 which may be a central processing unit CPU such as an Intel Haswell processor, an Advanced Micro Devices (AMD) Kaveri processor, or one of many other suitable processing devices currently available. In this embodiment, a host processing device in the form of CPU 105 may execute a host operating system (OS) 205 for system 100. System memory may include main system memory 115 (e.g., volatile random access memory such as DRAM or other suitable form of random access memory) coupled (e.g., via DDR channel) to an integrated memory controller (iMC) 117 of CPU 105 to facilitate memory functions, although it will be understood that a memory controller may be alternatively provided as a separate chip or other circuit in other embodiments. Not shown is optional nonvolatile memory (NVM) such as Flash, EEPROM or other suitable non-volatile memory that may also be coupled to CPU 105.

Figure 1B:
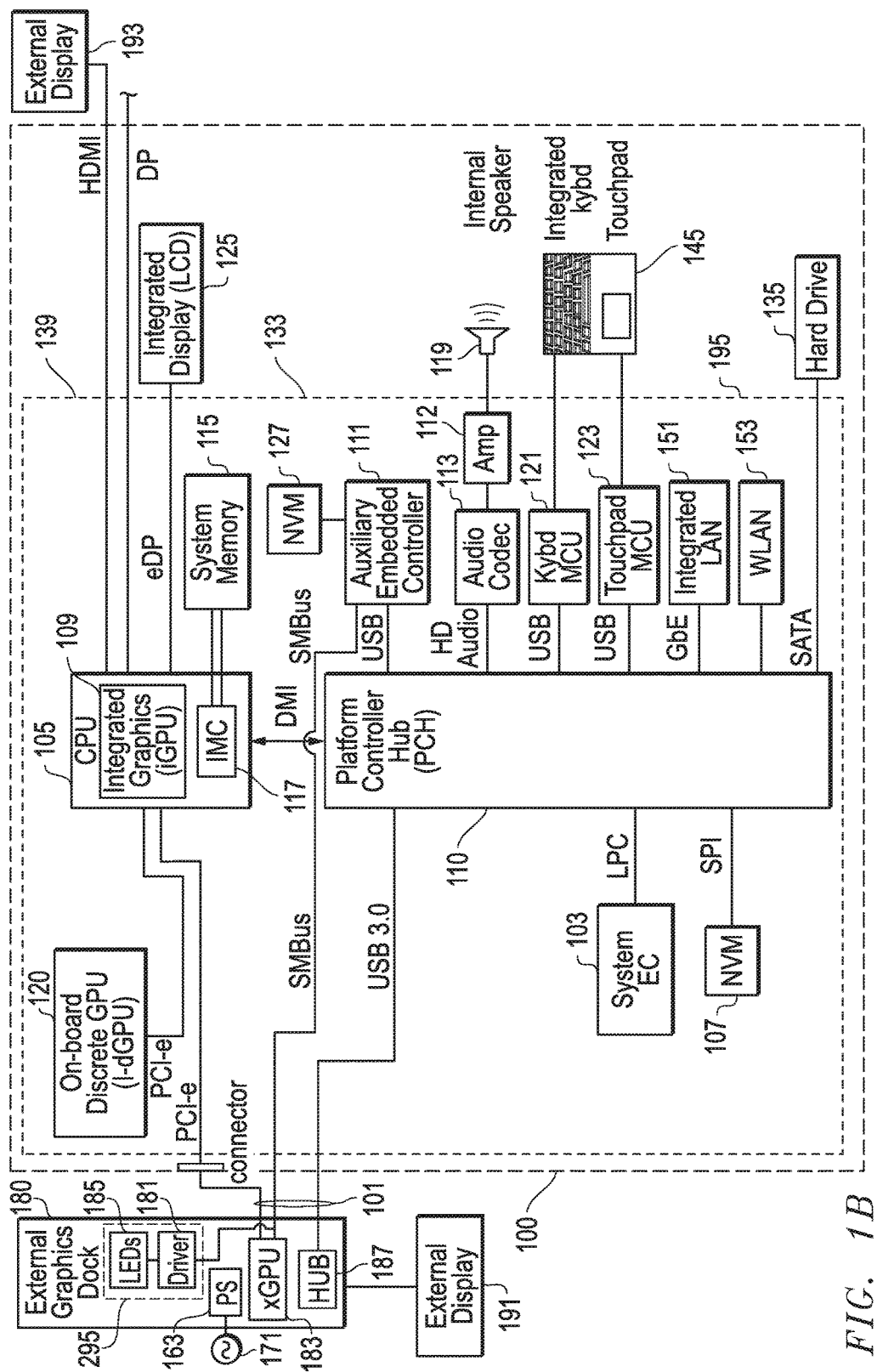
FIG. 1B illustrates a block diagram of an information handling system coupled to external components according to one exemplary embodiment of the disclosed systems and methods.
Figure 2:
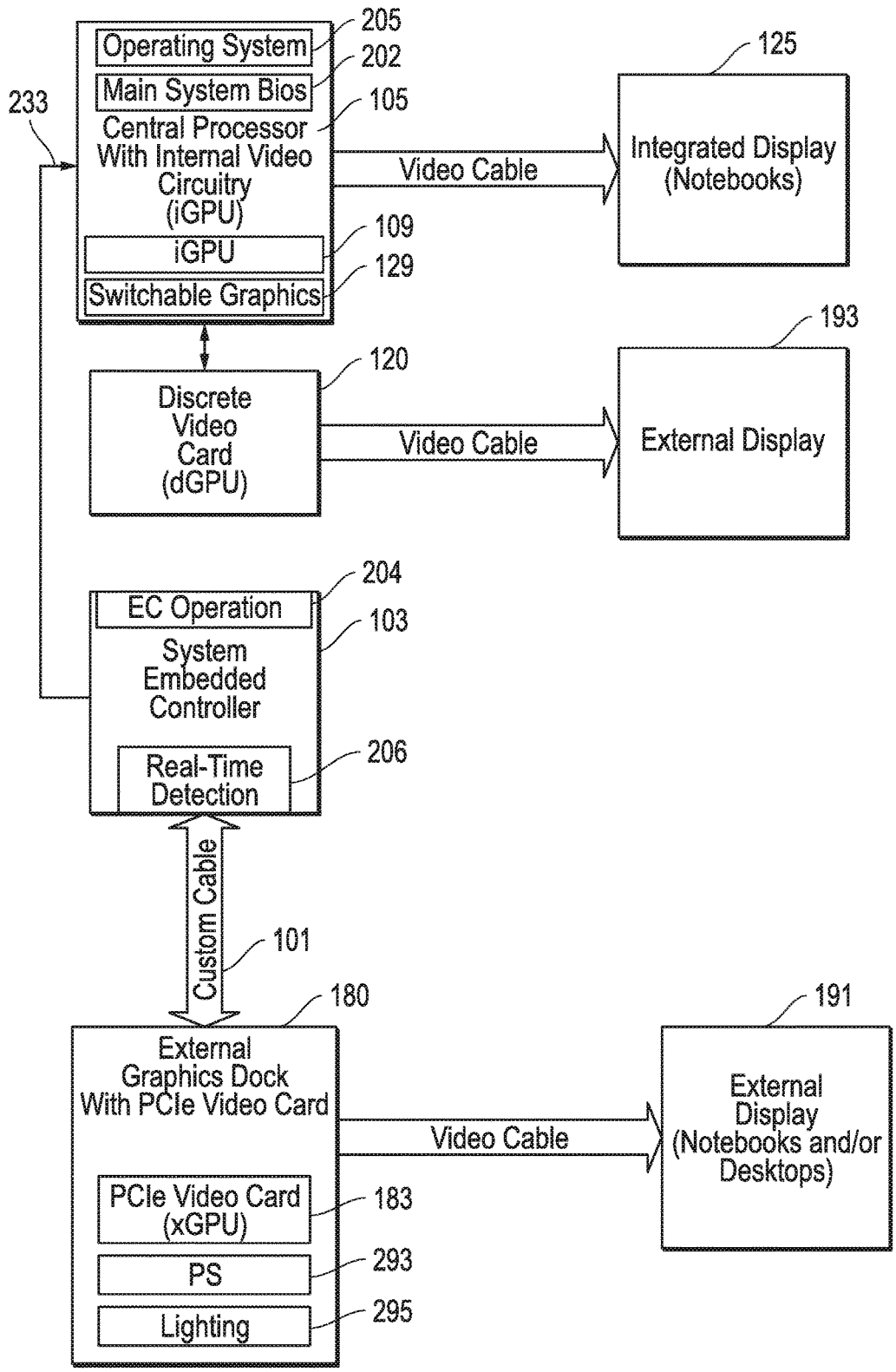
FIG. 2 illustrates a block diagram of component configuration for orchestrating external graphics according to one exemplary embodiment of the disclosed systems and methods.

As shown in FIG. 1A, CPU 105 itself includes an integrated GPU (iGPU) 109 and information handling system 100 also includes a separate internal discrete GPU (I-dGPU) 120 that may be powered by a power source of information handling system (e.g., such as AC adapter and/or internal smart battery pack of a notebook computer) using internal integrated power supply circuitry and/or internal voltage regulation circuitry of information handling system 100. In one mode of operation, video content from CPU 105 may be sourced at any given time either by iGPU 109 or I-dGPU 120, and is switchable "on the fly" from one to the other using drivers of a switchable graphics software utility 129 (e.g., NVidia Optimus available from NVidia of Santa Clara, California; AMD Power Express available from Advanced Micro Devices Inc. of Sunnyvale, California) that is illustrated in FIG. 2 as executing on CPU 105 and that is typically provided by a supplier of the given I-dGPU 120 that is presently installed in information handling system 100. As shown in FIG. 1A, at least one first external display 193 (e.g., LCD display or other suitable display device) may be coupled (e.g., via digital HDMI or DVI, analog D-Sub/S VGA, etc.) by suitable connector and external video cabling to receive and display visual images received from I-dGPU 120 of information handling system 100. I-dGPU 120 may be, for example, a PCI-Express (PCI-e) graphics card that is coupled to an internal PCI-e bus of information handling system 100 by multi-lane PCI-e slot and mating connector. In this exemplary embodiment, I-dGPU 120 is coupled to CPU 105 by optional 2:1 PCI-e multiplexer (mux) 182 that is in turn coupled to single graphics input/output (I/O) from iGPU 109 of CPU 105 by an internal PCI-e bus as shown. In an alternate embodiment, a CPU 105 may be provided having multiple (e.g., two) graphics I/O's, in which case PCI-e mux may be omitted as illustrated in FIG. 1B.

In the embodiment of FIG. 1A, at least one second external display 191 (e.g., LCD display or other suitable display device) is directly coupled to at least one external discrete GPU (XGPU) of an external graphics dock system 180 (e.g., via digital HDMI or DVI, analog D-Sub/SVGA, etc.) by suitable external video cabling such that the docking system is in-between the system 100 and the second external display 191. External graphics dock system 180 is in turn coupled to CPU 105 via suitable data bus cable 101 such as PCI-e, PCI-e connector or other data bus interface connector, and mux 182 as shown, the latter of which switches video output from CPU 105 between I-dGPU 120 and xGPU/s of external graphics dock system 180. It will be understood that PCI-e is just one example of a suitable type of data bus interface that may be employed to route graphics data between internal components of information handling system 100 and/or external graphics components coupled to information handling system 100. Moreover, other examples of suitable data bus interfaces that may be employed for handling video data to communicate video signals between system 100 and dock system 101 include, but are not limited to, a Thunderbolt interface and/or using encapsulated PCI-e data.

External graphics dock system 180 may also be optionally coupled to information handling system 100 by a separate USB bus or other type data bus cable for purposes of allowing for connection of external I/O devices (e.g., such as keyboards, printers, etc.) via spare external USB 3.0 connectors to an optional USB hub chip 187 provided within external graphics dock system 180. Other signal conductors or data buses, such as SMBus or Inter-Integrated Circuit (I2C) bus may be optionally coupled between components of system 100 and dock 180 as shown, e.g., for purpose of providing communication between components of dock 180 and auxiliary EC 111 and system EC 103, communicating commands from system 100 as to what lighting effects should be employed (e.g., pulsing, morphing, static) by dock lighting 295, etc. Thus, for example, a common connector including PCI-E, SMBus (or I2C bus) and USB 3.0 bus interconnects may be optionally employed with a custom cable 101 that includes corresponding PCI-E, SMBus (or I2C bus) and USB conductors for coupling information handling system 100 to external graphics dock system 180. In one embodiment, external graphics dock system 180 may include power supply and voltage regulation circuitry 163 that is powered directly by AC mains current 171 so that it requires no operating power be supplied from information handling system 100. In such a case, a custom cable 101 may also include conductors for power good and power up signals to enable operation as described further herein.

In another embodiment, external graphics dock system 180 may also be optionally coupled as described above to information handling system 100 by a separate SMBus (or I2C bus) for purposes of communicating external graphics dock chassis lighting colors, luminance level and effects (e.g. pulsing, morphing) from Auxiliary Embedded Controller 111 to LED Driver chip 181 (e.g., such as Texas Instruments TLC59116F) located inside the external graphics dock system 180, in which case a common connector including SMBus (or I2C bus), PCI-E and USB bus interconnects may be optionally employed with a custom cable 101 including SMBus (or I2C bus), PCI-E and USB conductors for coupling information handling system 100 to external graphics dock system 180. In one such an embodiment, an LED Driver chip 181 may be coupled to SMBus conductors provided within dock system 180 and configured to drive RGB LEDs (or other lighting elements) 185 of dock lighting 295 inside the dock system 180 based on SMBus signals received across a two-wire SMBus of cable 101 from auxiliary EC 111 of system 100.

It will also be understood that persistent storage (e.g., non-volatile memory) may be additionally coupled to PCH 110, system EC 103 and/or auxiliary EC 111. Such persistent storage may store or contain firmware or other programming that may be used by EC 103 and/or EC 111 to implement one or more user-defined system configurations such as keyboard lighting options, dock system lighting options (e.g., for controlling dock system lighting 295), mouse lighting options, audio output settings, power management settings, performance monitoring recording settings, designated keyboard macros and/or variable pressure key settings and/or macros, for example, in a manner such as described in U.S. Pat. Nos. 7,772,987; 8,700,829, 8,411,029, U.S. patent application Ser. No. 14/182,647 filed Feb. 18, 2014, and U.S. patent application Ser. No. 14/013,603 filed Aug. 29, 2013, each of which is incorporated herein by reference in its entirety. In one example illustrated in FIGS. 1A and 1B, dedicated non-volatile memory 127 may be directly coupled to auxiliary EC 111 for this purpose as shown.

Examples of lighting control technology and techniques that may be utilized with the features of the disclosed systems and methods may be found, for example, in U.S. Pat. Nos. 7,772,987; 8,411,029, U.S. patent application Ser. No. 14/182,647 filed Feb. 18, 2014, and U.S. patent application Ser. No. 14/013,603 filed Aug. 29, 2013, each of which is incorporated herein by reference in its entirety.

As further illustrated in FIG. 1A, CPU 105 may be coupled to embedded platform controller hub (PCH) 110 which may be present to facilitate input/output functions for the CPU 105 with various internal components of information handling system 100. In this exemplary embodiment, PCH 110 is shown coupled to other embedded components on a motherboard 133 (remove 139) that include system embedded controller 103 (e.g., used for real time detection of events, etc.), non-volatile memory 107 (e.g., storing BIOS, etc.), wireless network card (WLAN) 153 for Wi-Fi or other wireless network communication, integrated network interface card (LAN) 151 for Ethernet or other wired network connection, touchpad microcontroller (MCU) 123, keyboard microcontroller (MCU) 121, audio codec 113, audio amplifier 112, and auxiliary embedded controller 111 which may be implemented by a microcontroller. The tasks and features of auxiliary embedded controller 111 may include, but are not limited to, controlling lighting effects (e.g., keyboard lighting effects) for the chassis of information handling system 100 and/or external dock system lighting effects, e.g., in response to user configuration and/or in response to commands from particular applications executing on CPU 105. One example of auxiliary EC 111 is an electronic light control (ELC) controller such as described in U.S. Pat. No. 8,411,029 which is incorporated herein by reference in its entirety. Also shown coupled to PCH 110 are other non-embedded internal components of information handling system 100 which include integrated display 125 (e.g., LCD display or other suitable integrated portable information handling system display device), internal speaker 119, integrated keyboard and touchpad 145, and local system storage 135 or other suitable type of permanent storage media such as solid state drive (SSD), optical drives, NVRAM, Flash or any other suitable form of internal storage.

In one embodiment, information handling system 100 may be a battery-powered information handling system that is coupled to a source of system (DC) power, for example AC mains and an AC adapter. Information handling system may also include an internal DC power source (e.g., smart battery pack) that is configured to provide system power source for the system load of information handling system, e.g., when an external source of system power is not available or not desirable. Further information on battery-powered information handling system architecture and components may be found in United States Patent Application Publication Number 20140281618A1, which is incorporated herein by reference in its entirety. It will also be understood that the particular configuration of FIGS. 1A and 1B are exemplary only, and that an information handling system may be configured with fewer, additional or alternative components than those illustrated in these figures, e.g., including a network interface card (wired and/or wireless).

FIG. 2 illustrates one exemplary configuration of the components of FIGS. 1A and 1B that may be implemented in one embodiment for orchestrating external graphics with switchable graphics capability using an external graphics docking system 180. In one embodiment, external graphics docking system 180 may be configured to accept one or more discrete xGPU cards 183 in connection with cable 101, e.g., via an internal graphics bus and corresponding graphics bus connector that are configured to allow a user to insert a full length desktop-size xGPU card into the connector to operably connect the xGPU card to information handling system 100 via cable 101. Examples of such full length desktop-size xGPU cards include single slot and dual-slot-wide PCI-e desktop graphics cards. In one embodiment, external graphics docking system 180 may be configured (e.g., with suitable connection socket and power supply) to accept and operate xGPU cards 183 having a power consumption of from about 250 Watts up to about 1000 Watts, alternatively from about 300 Watts up to about 750 Watts, alternatively from about 400 Watts up to about 750 Watts, and further alternatively from about 500 Watts up to about 750 Watts. In one particular embodiment, external graphics docking system 180 may be configured to accept and operate an xGPU card 183 may be a full-length dual-slot-wide PCI-e desktop graphics cards with a 375 Watt power consumption. It will be understood, however, that an external graphics docking system 180 may be configured to accept and operate xGPU cards 183 of greater and lesser sizes and/or power consumption.

It will further be understood that the disclosed graphics orchestration systems and methods may be simultaneously implemented using xGPU card 183 connected and operating within dock 180 that is manufactured by a different manufacturer or provided by a different vendor than a I-dGPU 120 that is simultaneously operating within an information handling system 100 that is connected by cable 101 to system 100. For example, an I-dGPU 120 within system 100 may be made by NVidia, while the xGPU card 183 operating within connected dock 180 may be made by AMD.

Examples of suitable graphics bus technologies that may be employed as internal graphics bus/connector for docking system 180 include, but are not limited to, the PCI-e bus. In one embodiment, when an xGPU is so coupled via cable 101 and activated to carry video signals from information handling system 100 to external dock 180, the internal I-dGPU 120 of information handling system 100 may be disabled and the xGPU 183 of dock 180 enabled in its place. In such an embodiment, the hardware and logic architecture described herein for information handling system 100 and external dock system 180 may be employed to enable information handling system 100 to implement switchable graphics features while the internal iGPU 109 of system 100 and the external xGPU card 183 of dock 180 are both active, i.e., to switch graphics between iGPU 109 and xGPU card 183. Moreover, external graphics system dock 180 and mated xGPU 183 may be powered independently of information handling system 100, e.g., by a separate power source such as AC mains power and using voltage regulation circuitry integrated within dock 180 such that xGPU 183 draws no power from information handling system 100 while xGPU 183 is operating.

As shown in FIG. 2, system embedded controller 103 is configured to execute real-time detection module 206 (e.g., software or other logic) that detects when one or more external graphics cards (xGPU) cards have been mated with external graphics dock system 180 in operable signal connection, e.g., plugged or otherwise electrically coupled via PCI slot to external graphics dock system 180 by cable 101. Real-time detection module 206 may also detect presence of a power-good signal provided from the dock 180, and may respond to such power good signal by cooperating with EC operating logic 204 to send a signal back to an internal power supply of the dock 180 to enable the dock power supply to turn on power to the dock 180. Other tasks that may be performed by real-time detection module 206 include reporting various status information to system BIOS 202 of information handling system 100 including, but are not limited to, the presence of a mated external xGPU video card in dock 180. System BIOS 202 may in turn respond by driving the PCI-e or other video data bus signals to the dock 180 and communicating with the external dGPU video card mated with dock 180. System embedded controller 103 may also be configured to detect when a system reboot is required.

As further shown in FIG. 2, modified main system BIOS 202 executed by CPU 105 may be configured to support various modes of operation of external graphics dock 180, e.g., such as modes 1-7 described elsewhere herein. Modified main system BIOS 202 may also be configured to send external system graphics dock events received from real time detection module 206 of system EC 103 to an external graphics orchestration software application that is also executing on CPU 105, as well as to provide status (e.g., when user presses Fn+F1, surprise removal, etc.) to the user via pop-up messages prompting the user for decision making choices they must make (e.g., whether to shutdown, reboot or cancel to continue proper undocking procedure. FIG. 2 also illustrates one embodiment of operating relationship between other components of FIGS. 1A and 1B that may be implemented to achieve external graphics orchestration as described herein.

It will be understood that in embodiments where the disclosed systems and methods are implemented with an notebook computer information handling system 100, the two "video cables" shown in FIG. 2 may actually implemented inside the CPU 105, and one connection is made to the Integrated Display 125. In the case where the disclosed systems and methods are implemented with a desktop personal computer information handling system 100, there may be physically two video connectors (and respective cables) provided: one connector may be located on the motherboard and may connect the video output from the iGPU 109 to an external display 193a, and the second video connector may be located on the discrete GPU card 120 and cable over to an external display 193b.

Examples of video modes that may be supported by the configuration of FIG. 2 include, but are not limited to, a default graphics mode in which the external graphics dock system 180 is not configured, and all switchable graphics video content for the host system is therefore sourced from internal (e.g., factory installed) graphics components of the host information handling system, such as internal iGPU 109 and internal dGPU 120. In an example mobile graphics mode, external graphics dock system 180 may be first operably coupled to information handling system 100 with cable 101 and configured for operation with an external xGPU, but then uncoupled from information handling system 100 when the user disconnects the cable 101 from dock 180 to the information handling system 100, in which case switchable graphics video capabilities revert back to the default mode (i.e., internal iGPU 109 and internal dGPU 120 are active). In a single source mode, a user may have coupled and configured external graphics dock system 180 with a dual-GPU external dGPU card 183, and both the internal iGPU 109 and internal dGPU 120 may be disabled. In this single source mode, GPU components of the external graphics dock system 180 become the only source of video output, capable of driving multiple external displays according to the capabilities of the external dGPU cards 183, e.g., while implementing dual graphics card software such as while implementing dual graphics card technology such as Nvidia SLI, ATI Crossfire, etc. In a dual source mode, the user may have coupled and configured an external graphics dock system 180 with a single-GPU external dGPU card 183, in which case the internal dGPU 120 is disabled, and both internal iGPU 109 and external dGPU 183 of docking system 180 provide video output simultaneously with internal dGPU 120 disabled.

In an exemplary default or mobile graphics mode 3 of Table 1 (i.e., iGPU 109 and I-dGPU 120 are active), a user may go into a GPU software utility (e.g., such as Nvidia Control Panel) executing on host CPU 105 to control switchable graphics drivers 129. In this regard, as user may be allowed by the switchable graphics drivers 129 to select (e.g., via whitelist entry) which applications executing on CPU 105 are automatically run/displayed by which of the two GPUs (iGPU 109 or I-dGPU 120). If no external monitor 193 is attached to system 100, video is automatically displayed on the integrated display 125. However, if an external monitor 193 is attached, the executing software will display on the designated primary display first (125 or 193), and may be moved by the user to the designated secondary display 125 or 193 (e.g., if configured as an extended monitor).

In an exemplary docked to external dock system graphics mode 5 of Table 1, the dock 180 is connected and the iGPU 109 and xGPU 183 of dock 180 are active. If no external monitors 191 or 193 are connected to system 100 or dock 180, all video content will be displayed from iGPU 109 on the integrated LCD 125. If external monitors 191 and/or 193 are attached to the information handling system 100 and/or dock 180, a user may again assign which applications are run on which GPU via whitelist entry using GPU software utility on CPU 105 to control switchable graphics drivers 129. Once again, a given application (e.g., such as game) may be designated by a user to automatically open on whichever monitor is set as the primary monitor, while other applications (e.g., web browser, email) which were last closed on the designated secondary display, will re-open in their last position on the secondary display—a function provided by display panel software of the operating system 205.

In single source or external graphics only mode 4 of Table 1 (e.g., a dual GPU card 183) is operating in the dock 180, all the internal GPUs 109 and 120 of the system 100 are disabled such that the user must connect separate video cables from the video outputs of the dual GPU-based xGPU card 183 to external monitor(s) 191 to allow display. No video content will be shown on the integrated display 125 since that path has been disabled when both internal GPUs 109 and 120 were disabled inside the system 100. As above in mode 5, when an application is opened, it may be configured by a user to open on the user-designated primary display. Applications such as games may be designated by the user to play on the primary display, but applications like web browsers and email can be moved over to a secondary monitor—a function provided by display panel software of the operating system 205. Thus, in mode, iGPU 109 and I-dGPU 120 are both disabled. The integrated display 125 is disabled. The video outputs from the dual GPU based xGPU 183 are active. Any and all video ports available on the xGPU card 183 may be cabled to an external monitor/s 191, and operated as noted above based on OS monitor functionality.

Figure 3:
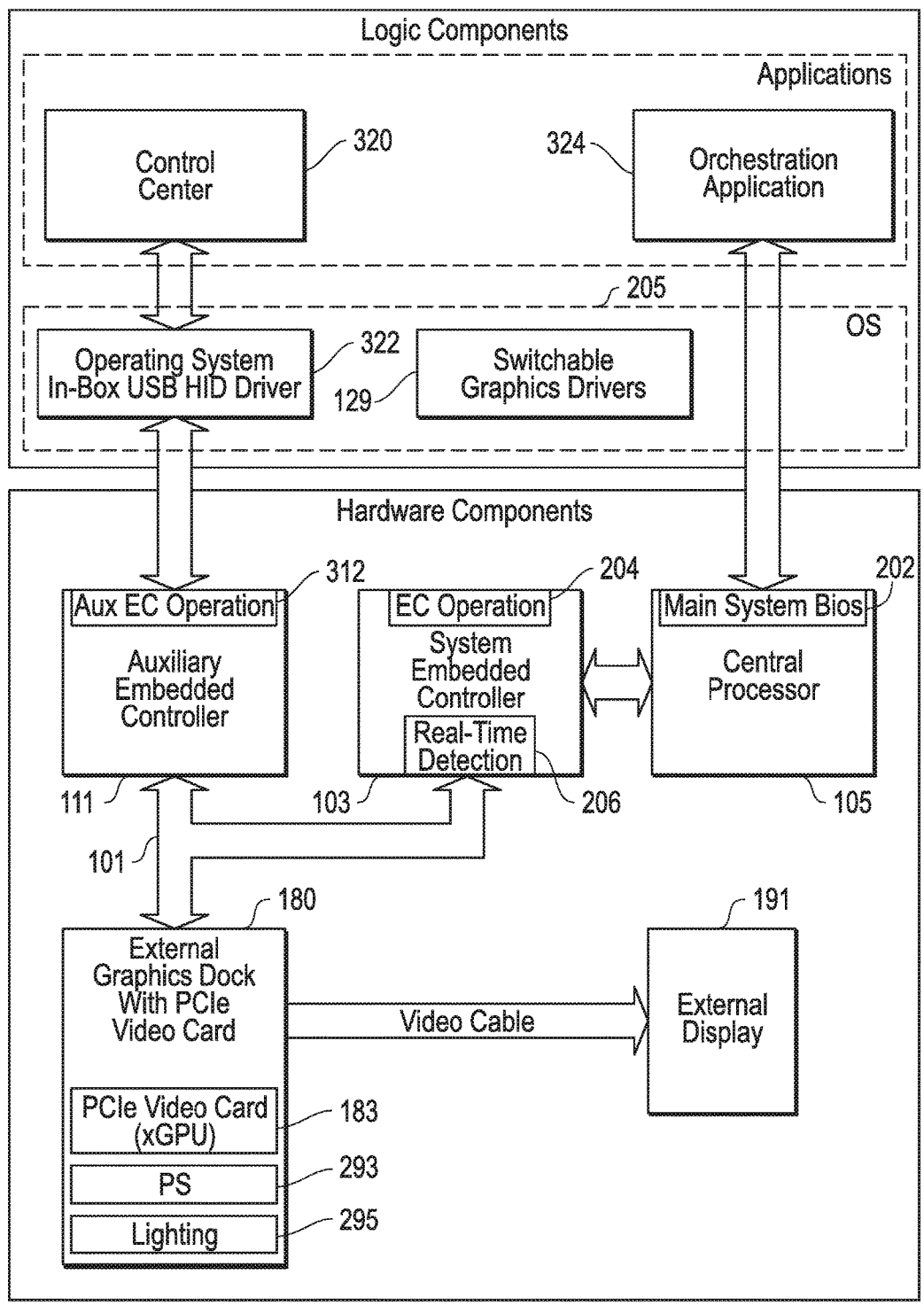
FIG. 3 illustrates a block diagram of external graphics orchestration process architecture according to one exemplary embodiment of the disclosed systems and methods.

FIG. 3 illustrates one exemplary embodiment of orchestration process architecture that may be implemented for external graphics orchestration according to the disclosed systems and methods. As illustrated in FIG. 3, the orchestration process architecture is implemented using both logic (e.g., software and/or firmware) and hardware components together to achieve orchestration of external graphics with switchable graphics capability. In this embodiment, auxiliary EC 111 is configured to receive the status (e.g., Dock 180 is ON) from system embedded controller 203 and then report this status up to a control center application 320 (e.g., such as the Alienware Command Center "AWCC" and "AlienFX Plug-In", both available from Dell Products L.P. of Round Rock, Texas) that is executing on CPU 105 so that it can control optional dock chassis lighting 295 (e.g., including one or more RGB LEDs) in the dock 180 through auxiliary EC 111 via signal/s provided across a SMBus or other communication bus provided separately within cable 101. Further information on gaming control centers 320 may be found, for example, in U.S. patent application Ser. No. 14/209,382, filed Mar. 13, 2014, which is incorporated herein by reference in its entirety. In one embodiment, communication between auxiliary EC 312 and control center 320 may be accomplished through operating system (e.g., Windows) in-box USB human interface device (HID) driver/s 322.

Still referring to FIG. 3, in one embodiment the first and initial time that external graphics dock system 180 is ever coupled to information handling system 100 by data bus 101, auxiliary EC 111 may be configured (e.g., using Aux EC operating logic 312) to listen for at least two events. In this regard, the auxiliary EC 111 first listens to determine if dock system 180 has been connected (i.e., cable present and connected), and if so, auxiliary EC 111 is configured to then launch an orchestration process from an orchestration application 324 that is executing on CPU 105. From that moment on, the orchestration application 324 may be configured in one embodiment to listen for the following four specific events:

Event 1: The dock cable 101 is connected
Event 2: A docking cable button is pressed to initiate undocking
Event 3: An undocking signal is received (e.g., Fn+F1 keystroke are pressed on keyboard 145) to initiate undocking
Event 4: Surprise disconnect of cable 101 (user yanked the cable out) has occurred In one embodiment, orchestration application 324 may run as a process in the background while listening to system BIOS events or custom system BIOS notifications from system BIOS 202 that pertain to connectivity of status system dock 180, and may be further optionally configured to act on such BIOS events and notifications by providing user messages (e.g., such as popup messages and/or link to an educational video describing proper external dock operation) to guide the user as necessary. In one embodiment, when the external dock system 180 is connected and operational, one or more standby modes such as S3 (Sleep) and S4 (hibernate) power states may be disabled for information handling system 100 to help ensure reliable and predictable operation. Further, as indicated above, in one embodiment a user may be given one or more ways to disconnect the external system dock 180. Examples of such disconnection methods include, but are not limited to, allow the user to generate an undocking signal by pressing a disconnect push-button 397 on either end of a custom cable 101, allowing a user to generate an undocking signal by pressing a keyboard key (or keystroke) combination. An optional signal may be provided upon receipt user undocking signal to indicate to the user that undocking is taking place, e.g., such as illuminating an integrated dual-color LED to flash red at both ends of the custom cable 101. Upon receipt of user undocking signal, any system level action may automatically take place, and the system 100 may revert to mobile graphics mode previously described, e.g., switchable graphics video capabilities revert back to the default mode (i.e., internal iGPU 109 and internal dGPU 120 are active).

Additionally, auxiliary EC 111 may be configured (e.g., using Aux EC operating logic 312) to listen for an undocking signal (e.g., Fn+F1 keystroke combination or other selected and pre-assigned undocking signal) that is input by a user. Upon first time occurrence of such an undocking user input signal, the auxiliary EC 111 may be configured to notify the user that this undocking user input signal does not work or is not enabled since the information handling system 100 has never seen a dock connected to it before. Additionally, when auxiliary EC 111 launches the Orchestration application 324, it may set up a Windows Registry key so the Orchestration application 324 will launch every time that the OS (e.g., Windows) starts on CPU 105.

Still referring to FIG. 3, orchestration application 324 may itself be configured in one embodiment to listen for particular events in real-time, and when any one or more of these events are present, orchestration application 324 may present the user with pop-up messages (e.g. on the monitor set as the primary display) instructing the user what to do next for proper docking or undocking of external graphics dock 180. In one embodiment orchestration application 324 may so listen for occurrence of any one or more of the following four events:

Event 1: The dock cable 101 is connected
Event 2: A docking cable button is pressed for undocking
Event 3: An undocking signal is received (e.g., Fn+F1 keystroke) for undocking
Event 4: Surprise disconnect of cable 101 has occurred In one exemplary embodiment, an orchestration application programming interface (API) may be provided on CPU 105 that allows orchestration application 324 to communicate directly with main system BIOS executing on CPU 105. Such an orchestration API may be configured, for example, to allow orchestration application 324 to obtain a docking report through CPU 105 that may include information such as the status of the dock system 180 (e.g., is it connected?, etc.); what mode a connected dock system 180 is currently in; the presence of any undocking flags present, etc. In a further embodiment, orchestration application 324 may be configured to clear all undock request flags and surprise removal flags that are present.

Following is description of external graphics orchestration startup steps that may be implemented in one embodiment using the architecture of FIG. 3. A user begins by configuring external graphics dock system 180 with at least one xGPU 183 and coupling the external graphics dock system 180 to components of information handling system 100 with physical cable/bus 101. Information handling system 100 may be powered on or off during this physical cable connection operation, but will transition to the power on state for orchestration process to continue. At this time, even though power supply 293 of external dock system 180 may be connected to AC mains power by a power cable, processing device and GPU components of dock system 180 will remain powered off by power supply 293 until connection of graphics communication across cable 101 is acknowledged by a "power good" is made by a valid dock connection signal, then sent to the System EC 103. The System EC 103 sends a "Dock ON" signal to the dock's Aux EC 111. When information handling system 100 is turned on and powered up (if not already so powered up), system EC 103 detects the dock's cable connection 101 and validates the presence of the xGPU card 183 inside the dock system 180 across cable 101.

Once the presence of xGPU 183 is validated, system EC 103 then sends a power-up signal (e.g., via dedicated signal path within a custom cable 101) to the external graphics dock system 180 to instruct dock power supply 293 to energize the external graphics dock system 180 (e.g., including also turning on other optional ancillary components of dock system 180 such as internal cooling fan, etc.). Then, across communication path 233 system EC 103 informs main system BIOS 204 executing on CPU 105 that xGPU card 183 is available (i.e., as a system component) and requires enumeration. In response, the OS executing on CPU 105 (e.g., Windows OS) loads the proper device driver for the xGPU card 183, and the xGPU card 183 becomes a valid video source, e.g., after a system restart is performed. After this occurs, auxiliary EC 111 receives connectivity status from the system EC 103, and provides a status report to control center application 320 executing on CPU 105.

For example, status report from Aux EC 111 to Control Center App 320 may in one embodiment be of the following types: 1) In the scenario of a first time dock connection of dock 180 to system 100, the Aux EC 111 status is used by the Control Center App 320 to call up the Orchestration App 324 to get installed and configured, after which the Orchestration App 324 gets installed. The next time the system 100 boots up, the Orchestration App 324 is now available for communication with the dock 180. 2) In all subsequent boot-ups when docked, the Aux EC 111 sends status to the Control Center App 320 to indicate that Power is on in the dock 180, and to light up the dock lighting 295 (e.g., chassis RGB LEDs) as per a lighting event profile stored in the Control Center App 320 (e.g., such as AlienFX Editor application available from Dell Products L.P. of Round Rock, Tex.). In such an embodiment, once the dock 180 is turned on, the lights 295 turn on to the color and lighting effects defined by the user in the Control Center App 320.

Further, in response to status report to control center application 320 from Auxiliary EC 111, the command center application 320 in turn enables the orchestration application 324 to run and detect the connectivity state of the system dock 180. In this regard, orchestration application 324 requests status from the main system BIOS 202 and determines a message (e.g., such as a popup message for the user on the primary display) that is provided to the user to guide the user to properly enable the system dock 180. In this regard, an application programming interface (API) may be provided that allows the Orchestrator App 324 to request status from System BIOS 202. Such status information may include, but is not limited to items such as: a) what mode are you in?, b) are there any undocking requests that may be pending, c) is a reboot required?, d) listening for user response to whether they wish to perform a shutdown, reboot or cancel in their undock procedure. In one embodiment, when external dock system 180 is properly enumerated, an optional indication may be provided as feedback to the user that the docking connection is now live (e.g., such as illumination of a dual-color LED integrated to a custom cable 101 that lights steady in a white color at both ends of the custom cable 101.

Figure 4:
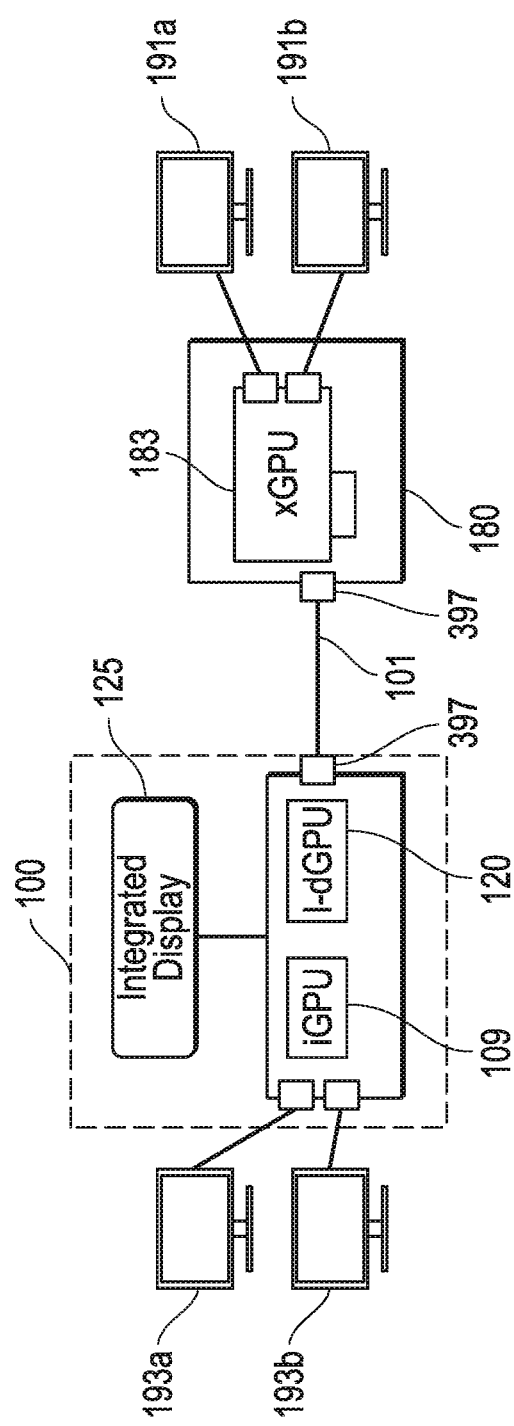
FIG. 4 illustrates a block diagram of information handling system and external graphics hardware configuration according to one exemplary embodiment of the disclosed systems and methods.

Table 1 lists multiple behavioral modes of external graphics orchestration operation that may be implemented in one exemplary embodiment on an exemplary notebook computer system and external graphics hardware configuration of FIG. 4 using the exemplary process architecture illustrated in FIG. 3, e.g., using logic implemented on CPU 105 (e.g., control center 320, orchestration application 324, main system BIOS 202 and switchable graphics drivers 129) together with logic 312 implemented by processing device of auxiliary EC 111 and logic 204 implemented by system EC 204. Examples of transition between selected behavioral modes of Table 1 are illustrated in FIGS. 5-9. With regard to Table 1 and FIGS. 4-9, whitelist applications may be applications (e.g., such as video games) that are selected by a user for display by a higher performance dGPU 120 or 183 rather than lower performance iGPU 109 and added to a whitelist that is accessed by switchable graphics drivers executing on CPU 105. It will be understood that a notebook computer is just one example type of information handling system with which one or more modes of Table 1 and other aspects of the disclosed systems and methods may be implemented. For example, one or more modes of Table 1 may also be implemented on a desktop PC that incorporates a CPU like the Intel Haswell processor which has an iGPU and IMC in the CPU.

TABLE 1

| Mode | Docking state | iGPU State (109) | Internal dGPU State (120) | External xGPU State (183) | Comments |
|---|---|---|---|---|---|
| 1 (FIG. 8) | Surprise Undocked | On | Off | N/A | iGPU only mode: Notebook in surprise undock state. Is a path for surprise removal when docked in Mode 5. |
| 2 | Undocked | Off | On | N/A | I-dGPU only mode: Requires display output muxes. |
| 3 (FIGS. 5-7) | Undocked | On | On | N/A | Normal (mobile) mode for Notebooks while undocked from external dock system: Supports switchable graphics technology (e.g., Optimus & PowerXpress). iGPU 109 is active. I-dGPU 120 activates as the active GPU for white list applications. |
| 4 (FIGS. 6 & 9) | Docked to external docking system | Off | Off | On | External graphics only: Used for restricted cards (i.e. dual GPU based desktop xGPU cards 183). Supports dual card technology (e.g., SLI & Crossfire) on dual xGPU 183. A monitor may be connected to the dock's xGPU card 183 and set to primary. |
| 5 (FIGS. 5 & 7-8) | Docked to external docking system | On | Off | On | Docked to external dock system: Supports switchable graphics technology (e.g., Optimus & PowerXpress). i-dGPU is OFF. xGPU 183 activates as the GPU to run white list applications. |
| 6 | Docked to external docking system | Off | On | On | dGPU (I-dGPU and xGPU) only mode: May be implemented with display output muxes that support multiple dGPUs 183 at the same time. May be implemented in one embodiment with discrete GPUs from the same vendor. |
| 7 | Docked to external docking system | On | On | On | Switchable graphics with iGPU and two dGPUs (I-dGPU and xGPU): May be implemented with display output muxes that support multiple dGPUs 183 at the same time. May be implemented in one embodiment with discrete GPUs from the same vendor. iGPU 109 may display on notebook |

TABLE 1-continued

| Mode | Docking state | iGPU Internal State (109) | dGPU State (120) | External xGPU State (183) | Comments |
|---|---|---|---|---|---|
| | | | | | integrated display 125 and notebook attached external monitors 193a and/or 193b. When docked, whitelist applications will start on xGPU 183. Prior to docking, whitelist applications will run in I-dGPU 120. |

Figure 5:
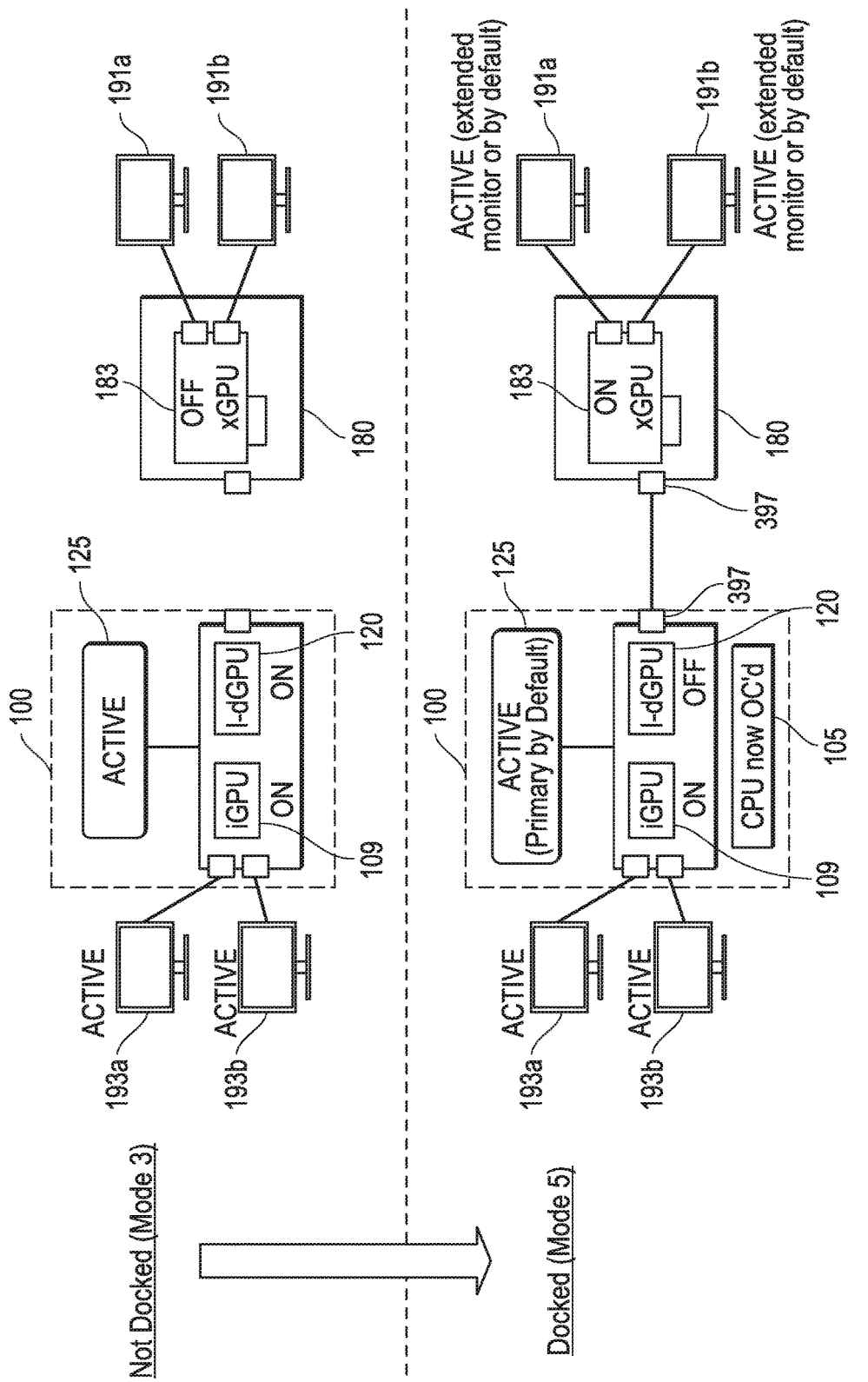
FIG. 5 illustrates a block diagram of information handling system and external graphics hardware configuration and status transition according to one exemplary embodiment of the disclosed systems and methods.

Referring now to FIG. 5, docking operation transition between modes 3 and 5 is illustrated. In particular, during normal (mobile) mode 3 (e.g., undocked notebook only) switchable graphics operation is supported and I-dGPU 120 activates as the GPU to run the select whitelist applications. When not in use, the I-dGPU 120 is disabled with all other applications displayed by iGPU 109. When external dock system 180 has been docked as shown via cable 101 to information handling system 100 and system 100 has been rebooted into switchable graphics docked mode 5, switchable graphics operation continues to be supported to activate the xGPU 183 only as the selected GPU to run the selected whitelist applications (rather than activating I-dGPU 120), and when not in use xGPU 183 is disabled with all other applications displayed by iGPU 109. In one embodiment, CPU 105 may be automatically overclocked (OC'd) in mode 5 but is not overclocked in normal (mobile) mode 3. In one embodiment, transitions between Mode 3 and Mode 5 may be via reboot only. It will be understood that where external monitors 191 and/or 193 are attached to the system 100 and/or the dock 180, the user may configure in the OS 205 which monitor is the primary and secondary display, including the integrated display (LCD) 125. If no external monitors 191 or 193 are attached, the integrated display 125 automatically is configured as the primary display and all video content goes to it.

Figure 6:
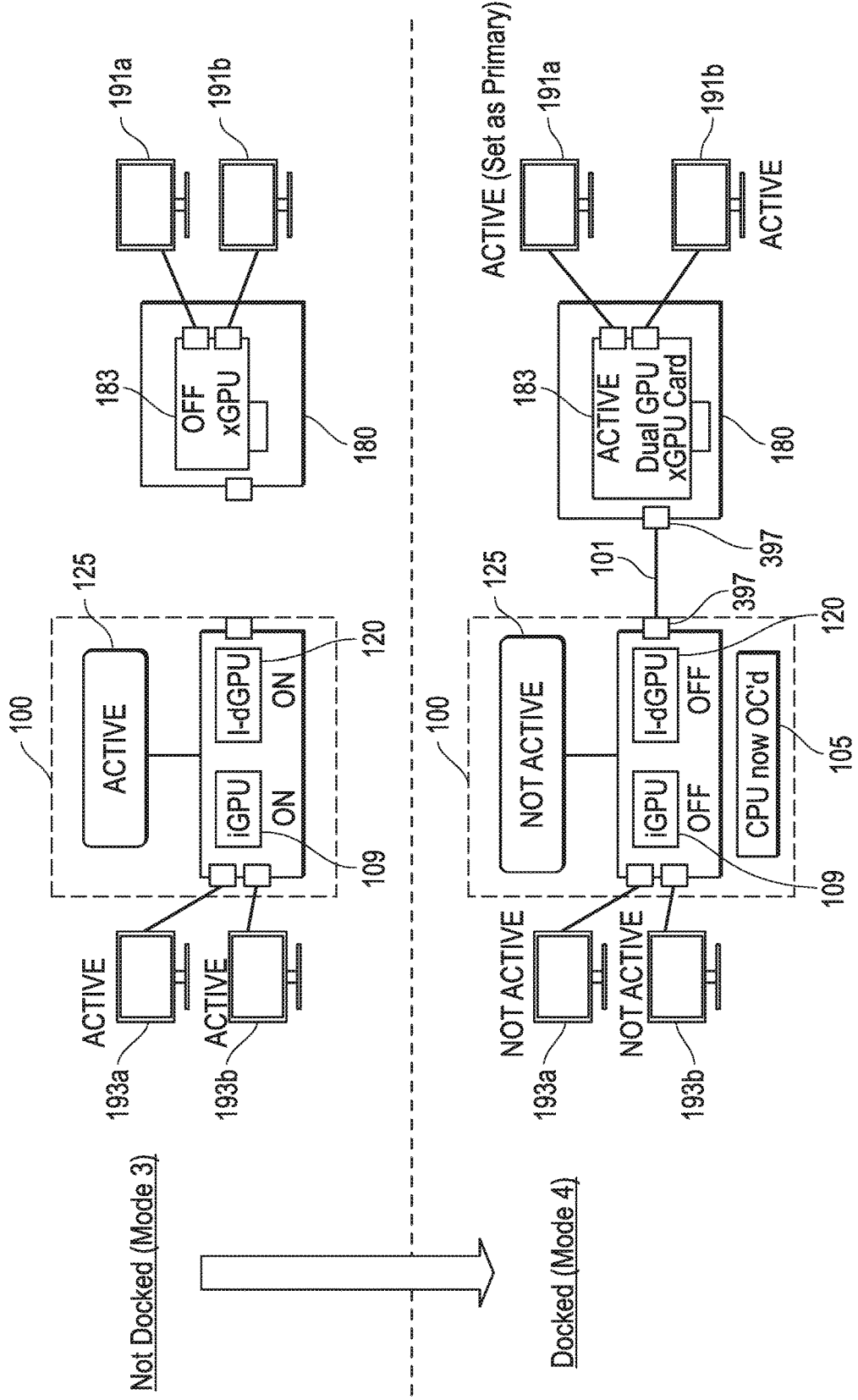
FIG. 6 illustrates a block diagram of information handling system and external graphics hardware configuration and status transition according to one exemplary embodiment of the disclosed systems and methods.

Referring to FIG. 6, docking operation transition between modes 3 and 4 is illustrated. In particular, normal mode 3 is the same as described in Table 1 and with regard to FIG. 5. Once again, during normal mode 3 (e.g., undocked notebook only) switchable graphics operation is supported and I-dGPU 120 activates as the GPU for select whitelist applications, and when not in use I-dGPU 120 is disabled with all other applications displayed by iGPU 109. When external dock system 180 having a dual GPU based desktop xGPU card 183 has been docked as shown via cable 101 to information handling system 100 and system 100 has been rebooted into docked external graphics only mode 4, all internal GPUs (iGPU 109 and I-dGPU 120) are disabled and turned off. As shown, all graphics are displayed (e.g., using dual card technology such as SLI or Crossfire) only on external displays 191a and 191b, and PC direct-attached displays and integrated display 125 are turned off. At this time, switchable graphics are not enabled on CPU 105, and a user should connect at least one external display 191 to dock 180 in order to maintain a viewable video display when rebooting from mode 3 to mode 4. In this regard, in one embodiment system BIOS 202 may detect presence of dual GPU based desktop xGPU card 183 at reboot and provide a power on self-test (POST) message to a user on the integrated display 125 that instructs the user to attach an external monitor 191 immediately since integrated display 125 is about to be turned off.

Figure 7:
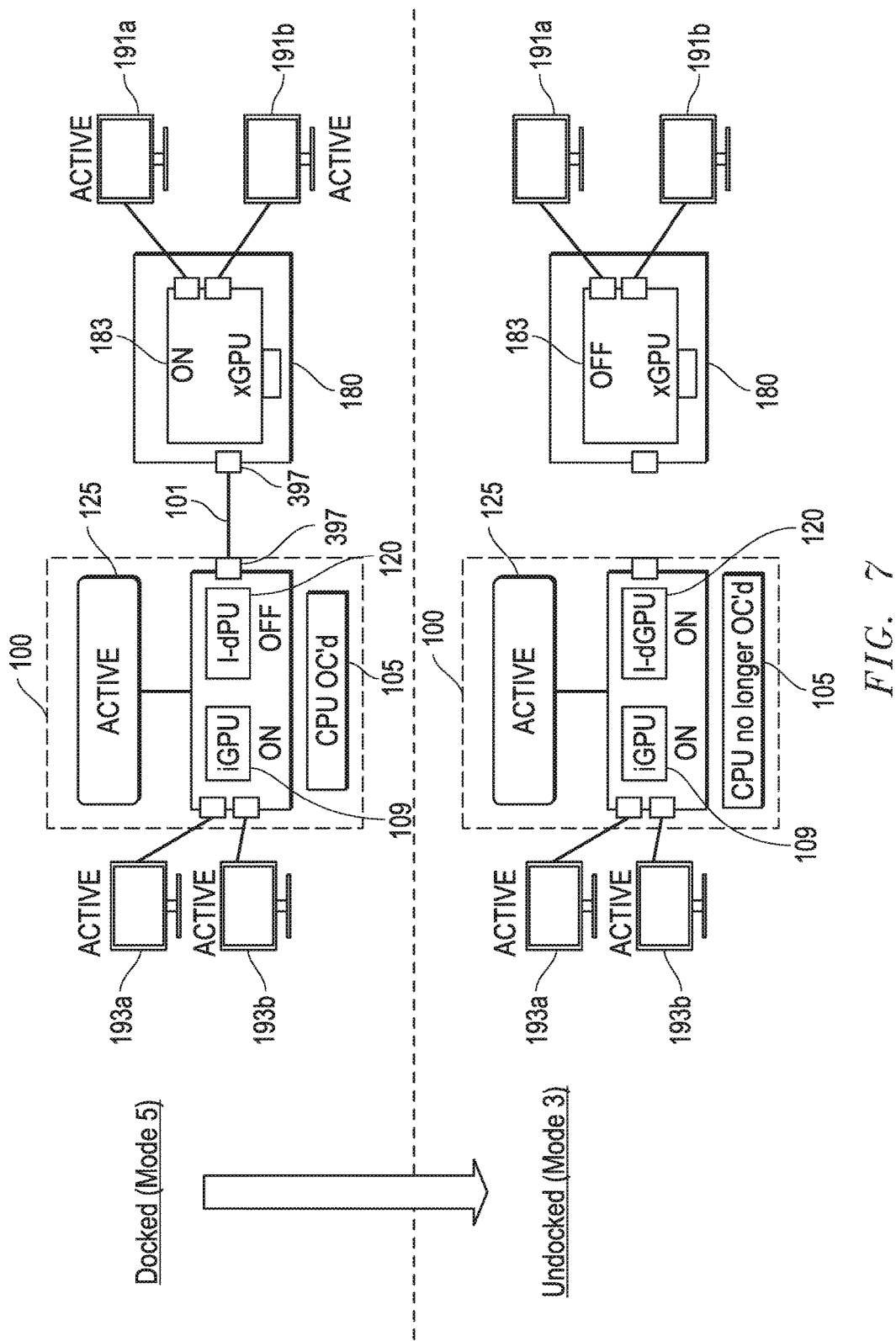
FIG. 7 illustrates a block diagram of information handling system and external graphics hardware configuration and status transition according to one exemplary embodiment of the disclosed systems and methods.

In FIG. 7, normal undocking operation transition between modes 5 and 3 is illustrated. In particular, modes 3 and 5 are the same as described in Table 1 and with regard to FIG. 5. In this undocking embodiment, a user may initiate undocking by generating an undocking signal, e.g., by pressing a dedicated disconnect button on custom cable 101, pressing a designated keystroke combination, etc. Following system reboot, system 100 reverts to mobile graphics mode 3 previously described.

Figure 8:
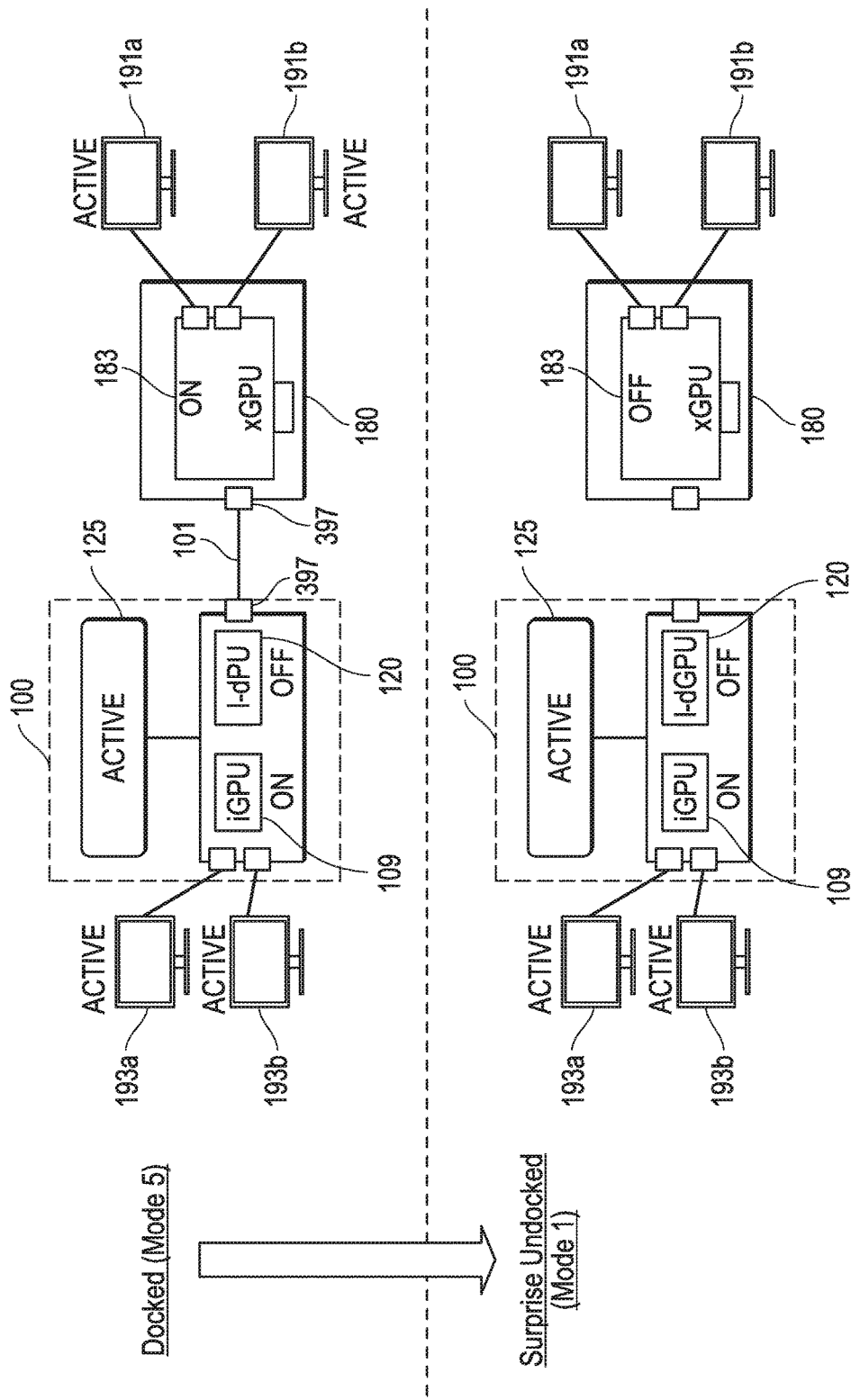
FIG. 8 illustrates a block diagram of information handling system and external graphics hardware configuration and status transition according to one exemplary embodiment of the disclosed systems and methods.

FIG. 8 depicts surprise undocking transition between docked mode 5 (internal and external graphics mode) to surprise undocked mode 1, such as when cable 101 is disconnected from either one of system 100 or external dock 180 in the absence of a user-generated undocking signal. As shown, in surprise undocked mode 1 no reboot has occurred and only iGPU 109 is enabled, i.e., i-dGPU 120 is turned off and no switchable graphics are enabled on CPU 105. In one embodiment, transitions between mode 1 and mode 5 may be via hot dock/undock. Thus, in a further embodiment, when undocking from mode 5, a user may have the opportunity to select whether they want to: a) reboot thus going to mode 3, or b) not reboot thus going to mode 1.

Figure 9:
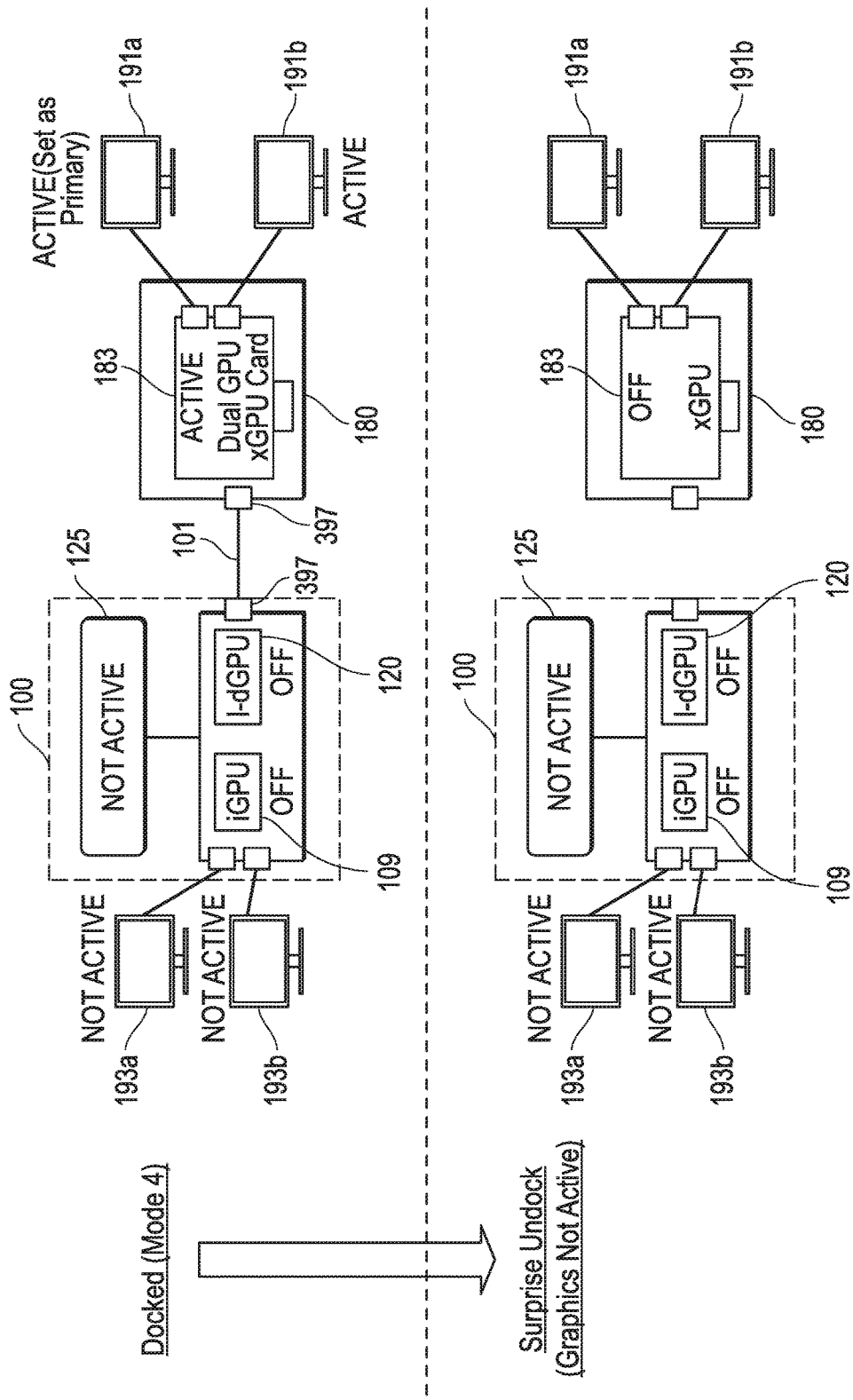
FIG. 9 illustrates a block diagram of information handling system and external graphics hardware configuration and status transition according to one exemplary embodiment of the disclosed systems and methods.

FIG. 9 depicts surprise undocking transition between docked mode 4 (external graphics only mode) to surprise undocked mode with inactive graphics. This may occur when cable 101 is disconnected from either one of system 100 or external dock 180 in the absence of a user-generated undocking signal. As shown, in this inactive graphics surprise undocked mode no display is currently active for the user to view. In such a mode, BIOS 202 may take automatic actions to address the situation, for example, by causing an audible beep or other sound on internal speaker 119 and then waiting a predefined amount of time (e.g., such as 10 seconds or other greater or lesser time) to give the user time to reconnect dock 180 to the information handling system 101. After expiration of such a predetermined time without dock reconnection, BIOS 202 may force reboot of the system.

Figure 10:
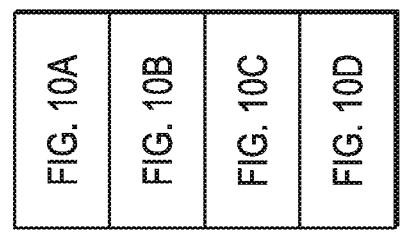
FIG. 10 illustrates the relationship between FIG. 10A, 10B, 10C and 10D.
Figure 10A:
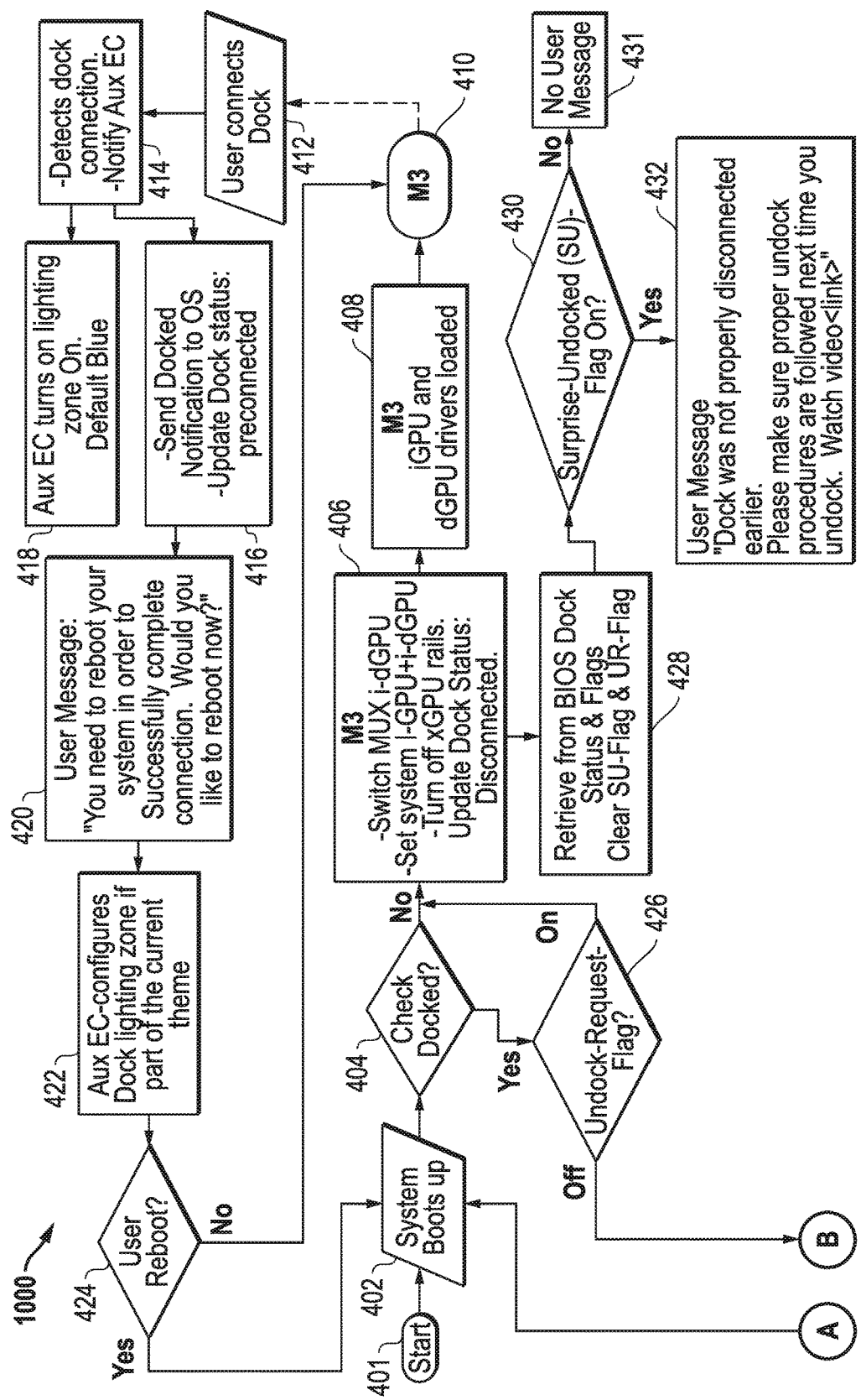
FIG. 10A illustrates a flow chart for external graphics orchestration according to one exemplary embodiment of the disclosed systems and methods.
Figure 10B:
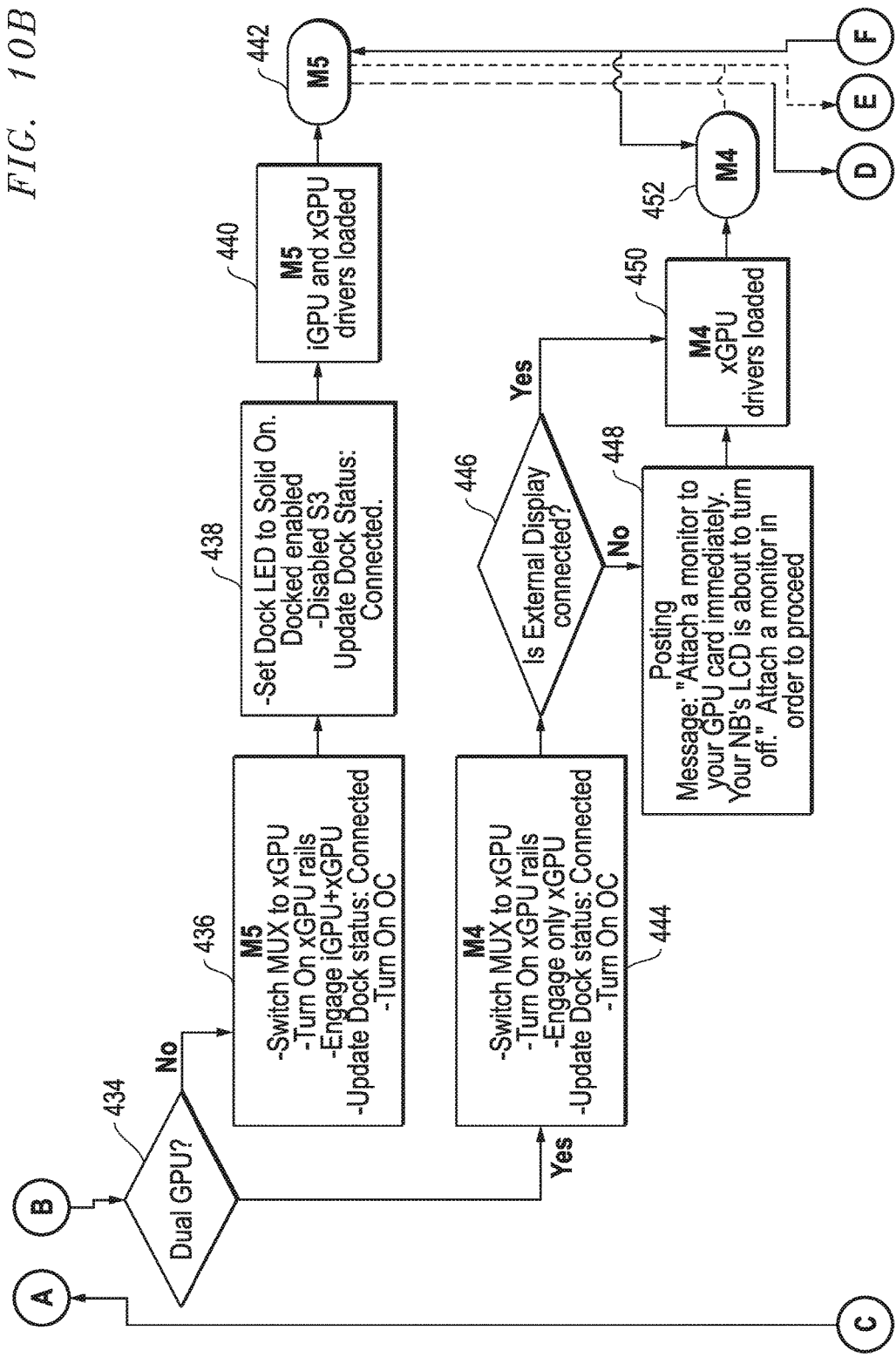
FIG. 10B illustrates a flow chart for external graphics orchestration according to one exemplary embodiment of the disclosed systems and methods.
Figure 10C:
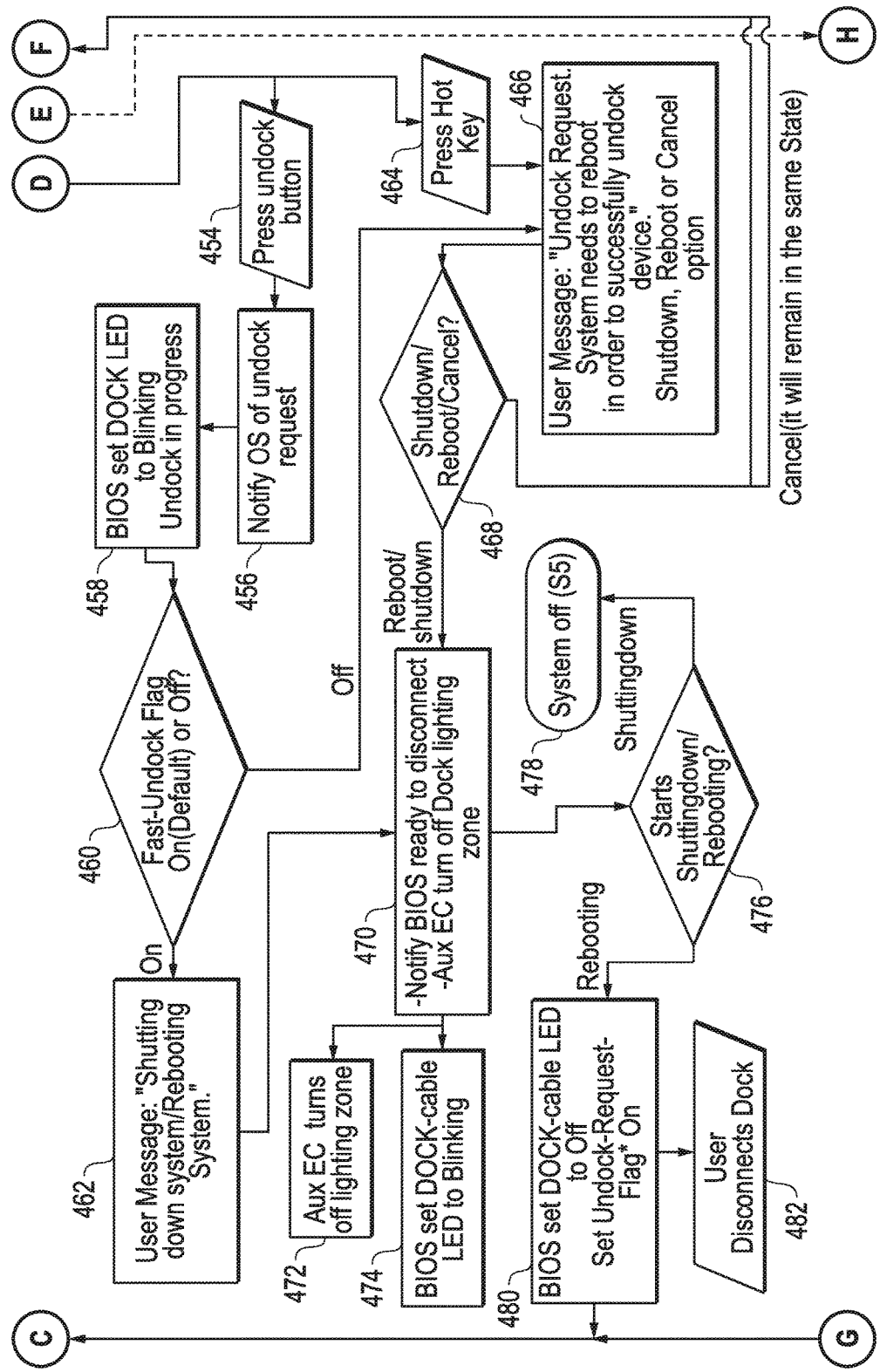
FIG. 10C illustrates a flow chart for external graphics orchestration according to one exemplary embodiment of the disclosed systems and methods.
Figure 10D:
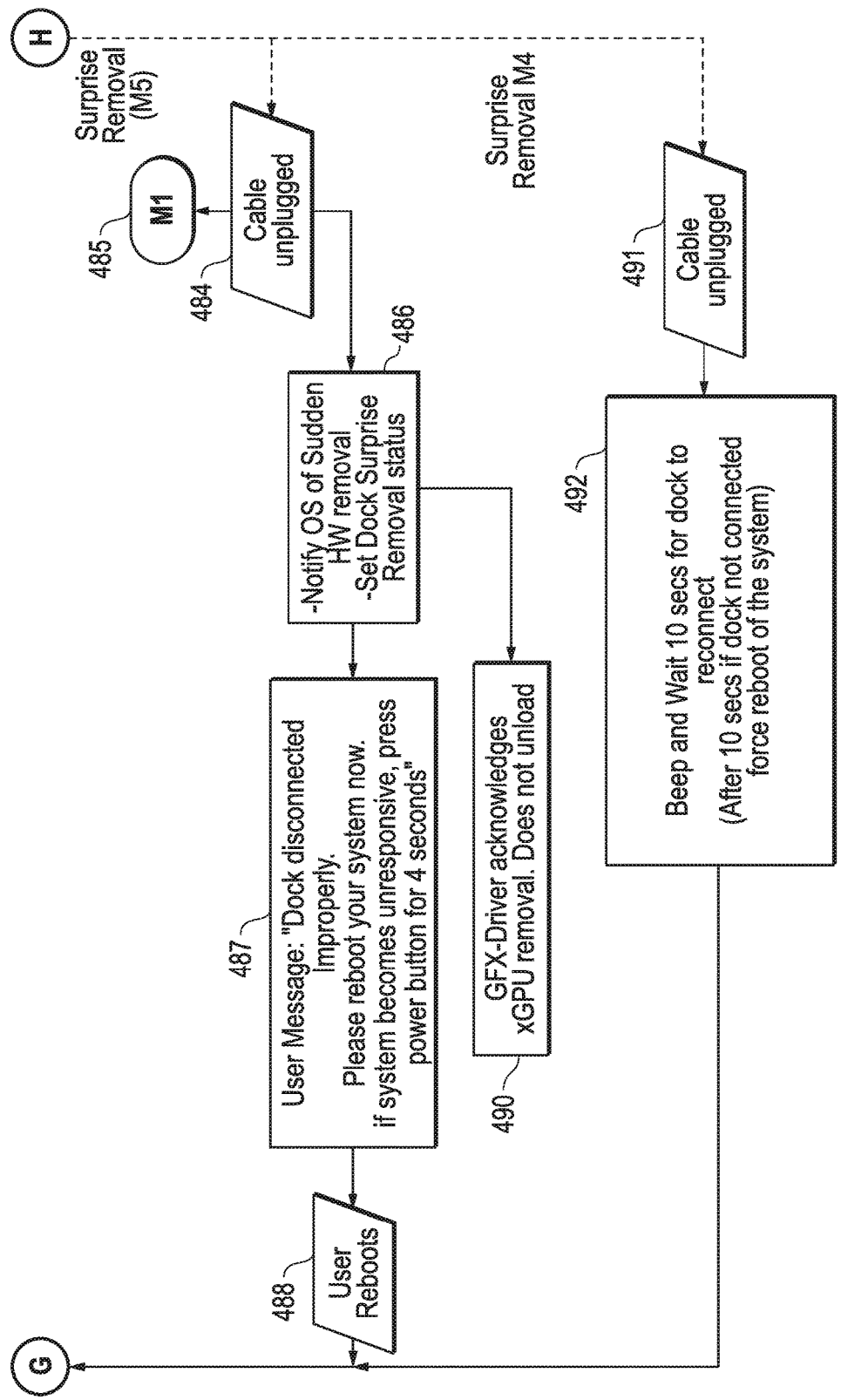
FIG. 10D illustrates a flow chart for external graphics orchestration according to one exemplary embodiment of the disclosed systems and methods.

FIG. 10 (which includes FIGS. 10A-10D) illustrates one exemplary embodiment of methodology 1000 that may be implemented in Advanced Configuration and Power Interface (ACPI) system "ON" power state S0 for graphics orchestration for docking and undocking of an external graphics dock system 180 by the various hardware and logic components described in relation to of FIGS. 1A and 2-9 to implement selected modes of Table 1. As shown, methodology 1000 starts at step 401 where information handling system 100 is powered on and boots up in step 402. Methodology 1000 then proceeds to step 404 where system BIOS 202 checks to determine if an external dock system 180 is docked and connected to information handling system 101 by cable 101. If no dock system 180 is docked to system 100, then methodology 1000 proceeds to step 406 where BIOS 202 initiates normal undocked mode 3 (M3) by setting MUX switch 182 to connect i-dGPU to CPU 105 for graphics, turning on i-GPU 109 and I-dGPU 120, turning off PCI-e signal xGPU rails, and updating current dock status to "disconnected" meaning no cable 101 is connected. At this time, orchestration application 324 executing on host CPU 105 implements step 428 by retrieving from system BIOS 202 the current dock status (docked or undocked) and any Surprise Undocked (SU) flag or a user Undock Request (UR) flag that may be present, and then clearing from BIOS 202 any such flags that may be present (note that in one embodiment the undock-request-flag coming from cold boot may always be set to OFF. Orchestration application 324 may then determine if a Surprise Undocked flag is present in step 430 and if so display an appropriate user message in step 432 such as "Dock was not properly disconnected earlier. Please make sure proper undock procedures are followed next time you undock. Watch video<link>" If no Surprise Undocked flag is found present, then no user message may be displayed as shown in step 431. From step 406, methodology 1000 also proceeds to step 408 where switchable graphics drivers 129 (e.g., Intel drivers for iGPU and appropriate i-dGPU drivers) are loaded and executed by CPU 105 to implement undocked mode 3 in step 410.

While operating in mode 3 of step 408, if a user then connects an external graphics docking system 180 in via cable 101 in step 412, methodology 1000 proceeds to step 414 where system BIOS 202 detects dock connection 101 and notifies auxiliary embedded controller (EC) 111 that dock 180 is now connected. Methodology 1000 then proceeds to step 418 where auxiliary EC 180 may turn on lighting zone/s of the dock chassis lighting 295 to a default setting (e.g., such as blue color). Methodology 1000 also proceeds at this time to step 416 where system BIOS 202 BIOS sends a Docked Notification to the host operating system (OS) 205 to update current dock status to "pre-connected" meaning cable 101 is connected, but xGPU 183 is not yet active or engaged. In step 420, orchestration application 324 executing on host CPU 105 may then optionally display on one or more of the available active displays of mode 3 a user message such as "You need to reboot your system in order to Successfully complete connection. Would you like to reboot now?". Then auxiliary EC 111 may optionally configure a dock lighting zone if determined to be part of the current lighting theme in step 422 and methodology 1000 proceeds to step 424 to wait for user to system reboot. If no reboot occurs, then methodology returns to step 410 and system 100 remains operating in normal mode 3 as shown. However, if user reboots the system 100 in step 424, then methodology 1000 returns to step 402 and proceeds to step 404 where system BIOS 202 will now determine that docking system 180 is connected to system 100 by cable 101 and thus proceed to step 426.

As shown, if an undock request flag is found present by BIOS 202 in step 426, then methodology 1000 returns to mode 3 of step 406. Such an undock request flag may be located in main system BIOS 202 and may be present due to a user previously providing an undocking signal to initiate an undock procedure, e.g., such as by entering a designated undocking keystroke combination, or by pressing undocking button/s 397 on the cable 101. However, if no undock request flag is found present then methodology 1000 proceeds to step 434 where BIOS 202 determines if a dual GPU-based xGPU card 183 is present (configured) within external graphics dock system 180. If not, then in step 436 BIOS 202 implements docked mode 5 (M5) by setting MUX switch 182 to connect a single xGPU 183 to CPU 105 for graphics, turning on xGPU rails, and engaging or turning on iGPU 109 and xGPU 183, and updating dock status to "connected" meaning cable 101 is connected and xGPU is engaged and active. Further if designated for M5, then over-clocking for CPU 105 may also be activated in step 436. Methodology 1000 then proceeds to step 438 where BIOS 202 may activate any optional lighting of dock system 180 (e.g., turning LED to solid on condition) and updating current dock status to "connected". From step 438, methodology 1000 also proceeds to step 440 where switchable graphics drivers 129 (e.g., Intel drivers for iGPU and appropriate xGPU drivers) are loaded and executed by CPU 105 to implement docked mode 5 in step 442.

If a dual GPU-based xGPU card 183 is found present in step 434, then in step 444 BIOS 202 implements docked mode 4 (M4) by setting MUX switch 182 to connect dual GPU-based xGPU card 183 to CPU 105 for graphics, turning on xGPU rails for PCI-e, and updating dock status to: Connected. Further if designated for M4, then over-clocking for CPU 105 may also be activated in step 444. Next, in step 446, BIOS 202 determines if at least one external display 191 is connected to xGPU card 183 of dock system 180. If not, then in step 448, BIOS system 202 may display a message on one or more of the available active displays of mode 3 (e.g., integrated display 125 and/or external display/s 193) to instruct a user to connect an external display 191, such as "Attach a monitor to your xGPU card immediately. Your notebook's LCD is about to turn off", or such as "Attach an external monitor to your xGPU card in order to proceed". In one embodiment, this BIOS message may remain on the display (driven by the iGPU 109) until the user presses any key on the keyboard, e.g., the user may do this after the user has connected an external display 191 to the external dock system 180. When the user presses any key on the keyboard, the screen will go blank and the iGPU 109 will be OFF. After step 448, appropriate switchable graphics drivers 129 for xGPU/s 183 are loaded in step 450 and executed by CPU 105 to implement docked mode 4 in step 452 as shown. If in step 446 at least one external display 191 is found connected to xGPU card 183 of dock system 180, then methodology 1000 proceeds directly to step 450 and loads drivers 129.

Referring now to step 454 of FIG. 10 in which system 100 is operating in either docking mode M4 or M5 (steps 452 or 442), if a user provides an undocking signal, such as by pushing undocking button/s 397, then BIOS 202 notifies OS 205 in step 456 that an undocking request has been received. Further, BIOS 202 may also optionally provide a visual undocking signal, e.g., by setting LED/s of lighting in the undocking buttons 397 to a blinking state to indicate that undocking is in progress in step 458. Orchestration application 324 may then determine in step 460 if a Fast-Undock Flag is set to On (Default) or Off. Such a Fast-Undock Flag may be optionally set by a user to configure system 100 to perform an un-prompted/automatic shutdown or reboot every time the user wants to undock the system 100 from the dock 180. One purpose of allowing a user to implement such an automatic fast undocking is to provide a faster undock procedure that does not require the user to respond to a pop-up message (e.g., asking the user if they wish to make a choice of shutdown, reboot or cancel) every time undocking is initiated by the user that.

If a Fast-Undock Flag is set to On, then orchestration application 324 may then display on one or more of the available active displays (depending on mode 4 or 5) a user message in step 462 such as: "Shutting down system/Rebooting System", and then proceed to step 470 where orchestration application 324 notifies BIOS 202 that system is ready for docking system disconnection, and instructs auxiliary EC 111 to turn off any optional Dock lighting zone/s. Auxiliary EC responds in step 472 by turning off any optional dock lighting zone, and BIOS 202 responds in step 474 by setting optional LED lighting of DOCK-Cable LED (e.g., LEDs may be located inside undocking buttons 397) to blinking state. At this time, orchestration application 324 determines whether default Fast undocking setting is set to automatically reboot or shutdown without further user input. As shown, if the fast undock default setting is to shutdown, then system 100 is next shutdown in step 478 to system off state (S5). However, if the fast undock default setting is set to reboot, then in step 480 BIOS 202 sets optional lighting of DOCK-cable's LEDs (e.g., found inside undock buttons 397) to Off and sets Undock-Request-Flag to On as shown. The user may then disconnect the dock system 180 in step 482, and the methodology returns to step 402 for system reboot.

Alternatively, when in docked mode 4 or 5 (either of steps 452 or 442), a user may provide an undocking signal in step 464 by pressing a hot key or keystroke combination to request undocking. When this occurs, orchestration application 324 may then display on one or more of the available active displays (depending on mode 4 or 5) a user message in step 466 such as: "Undock Request. System needs to reboot in order to successfully undock device" and give the user Shutdown, Reboot or Cancel options. The user may then provide a selected undocking option in step 468 (e.g., one of Shutdown, Reboot, or Cancel) as shown. If user selects the Cancel option in step 468, then methodology 1000 returns to previous mode 4 or mode 5 as applicable. However, if user selects Reboot or Shutdown option in step 468, then methodology 1000 proceeds to step 470 which operates as previously described above, with step 476 proceeding to reboot or shutdown option based on the user selection made in step 468.

As further shown, when in docked mode 4 or 5 (either of steps 452 or 442), a surprise undocking (SU) may occur without user undocking signal as shown in step 484 (SU occurs while in M5) or in step 491 (SU occurs while in M4). As shown when surprise undocking occurs during M5, system 100 proceeds to M1 mode in step 485 (e.g., see FIG. 8). In such a case, BIOS 202 notifies OS 205 of sudden hardware removal of dock 180 and sets Dock Surprise Undocking (SU) flag in step 486 and switchable graphics drivers 129 acknowledges xGPU removal in step 490 without unloading. At this time, orchestration application 324 may then use iGPU 109 to display a surprise undocking user message on integrated display 125 and/or external display 193 in step 487 such as: "Dock disconnected Improperly. Please reboot your system now. If system becomes unresponsive, press power button for 4 seconds". The user may then respond to instructions of step 487 by rebooting the system in step 488, in which case methodology 1000 returns to step 402 and reboots.

When SU occurs during M4, system 100 proceeds to step 491 (e.g., see FIG. 9). In such a case, BIOS 202 may take one of several actions given that no display is currently active for the user to view. For example, in step 492, BIOS 202 may cause an audible beep on internal speaker 119 and then wait a predefined amount of time (e.g., such as 10 seconds or other greater or lesser time) for the dock 180 to be reconnected. After expiration of the predetermined time without dock reconnection, BIOS 202 may force reboot of the system and return to step 402.

Figure 11:
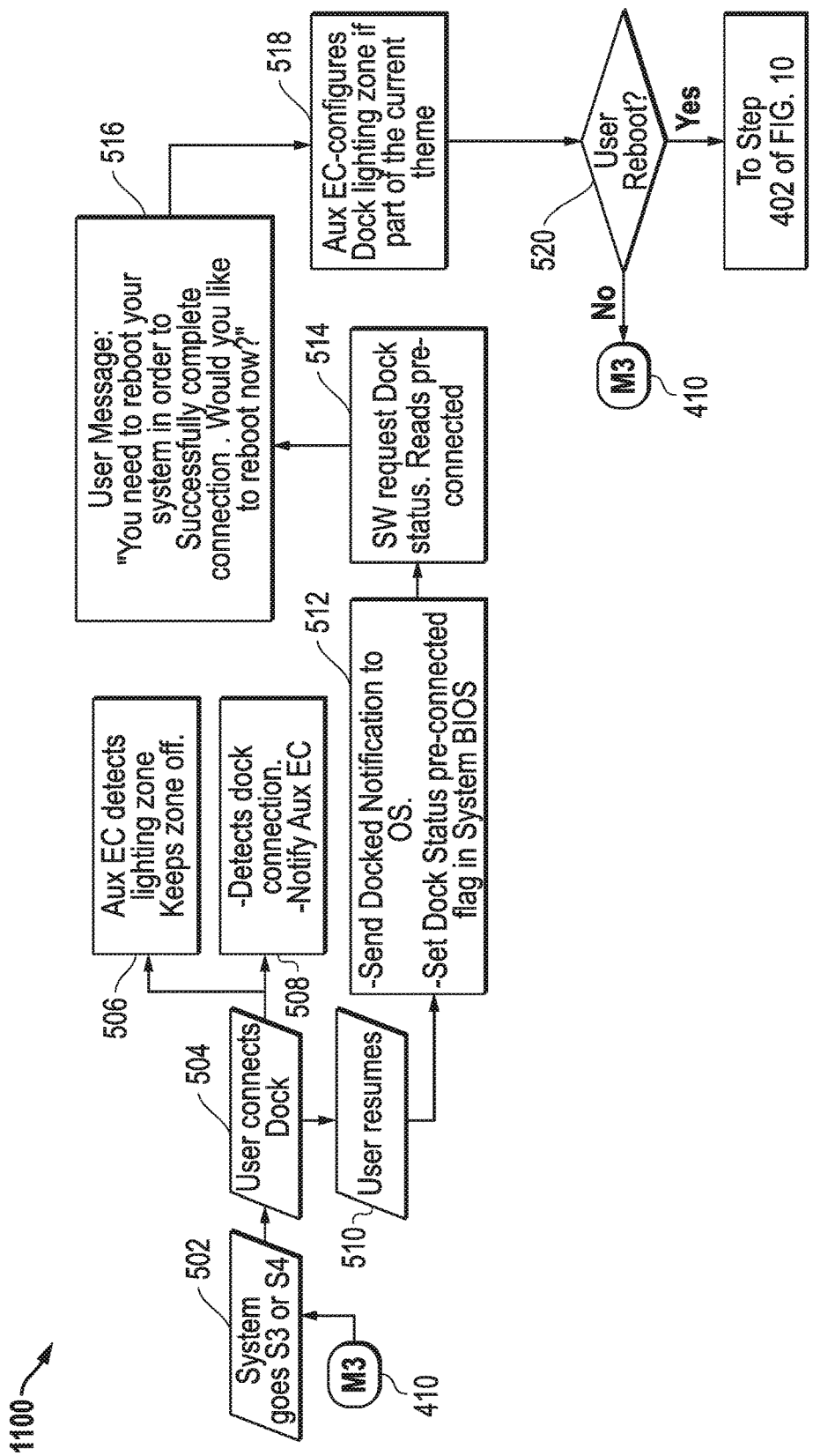
FIG. 11 illustrates a flow chart for external graphics orchestration according to one exemplary embodiment of the disclosed systems and methods.

FIG. 11 illustrates one exemplary embodiment of methodology 1100 that may be implemented in Advanced Configuration and Power Interface (ACPI) system "SLEEP" power state S3 and "HIBERNATE" power state S4 for graphics orchestration for docking and undocking of an external graphics dock system 180 by the various hardware and logic components described in relation to of FIGS. 1A and 2-9 in order to implement selected modes of Table 1. As shown, methodology 1100 starts at step 502, where information handling system 100 enters a S3 or S4 power state from normal (mobile) graphics mode 3 as described in relation to step 410 of FIG. 10. As shown, a user may then connect external graphics dock 180 by cable 101 in step 504 in which case system BIOS 202 detects the connection/presence of dock 180 and notifies auxiliary EC 111 of same in step 508. Auxiliary EC may detect the lighting zone and keep the zone off in step 506.

As shown in FIG. 11, the user resumes use of information handling system 100 in step 510 as the system 100 transitions to S0 ("ON") state from S3 or S4 state. In step 512, system BIOS 202 sends docked status notification to operating system 205, and the dock status pre-connected flag is set in BIOS 202. Orchestration application 324 then requests dock state and reads the "pre-connected" status from BIOS 202 in step 514. Orchestration application 324 may respond in step 516 by displaying a user message on integrated display 125 and/or external display 193, e.g., such as "You need to reboot your system in order to Successfully complete connection. Would you like to reboot now?" At this time auxiliary EC 111 may configure a dock lighting zone if it part of the current lighting theme in step 518, and methodology 1100 proceeds to step 520 to wait for user to system reboot. If the user chooses not to reboot in step 520, then methodology returns to step 410 of FIG. 10 where system 100 remains operating in normal mode 3. However, if the user chooses to reboot the system 100 in step 520, then methodology 1100 proceeds to step 402 of FIG. 10 and proceeds accordingly.

Figure 12:
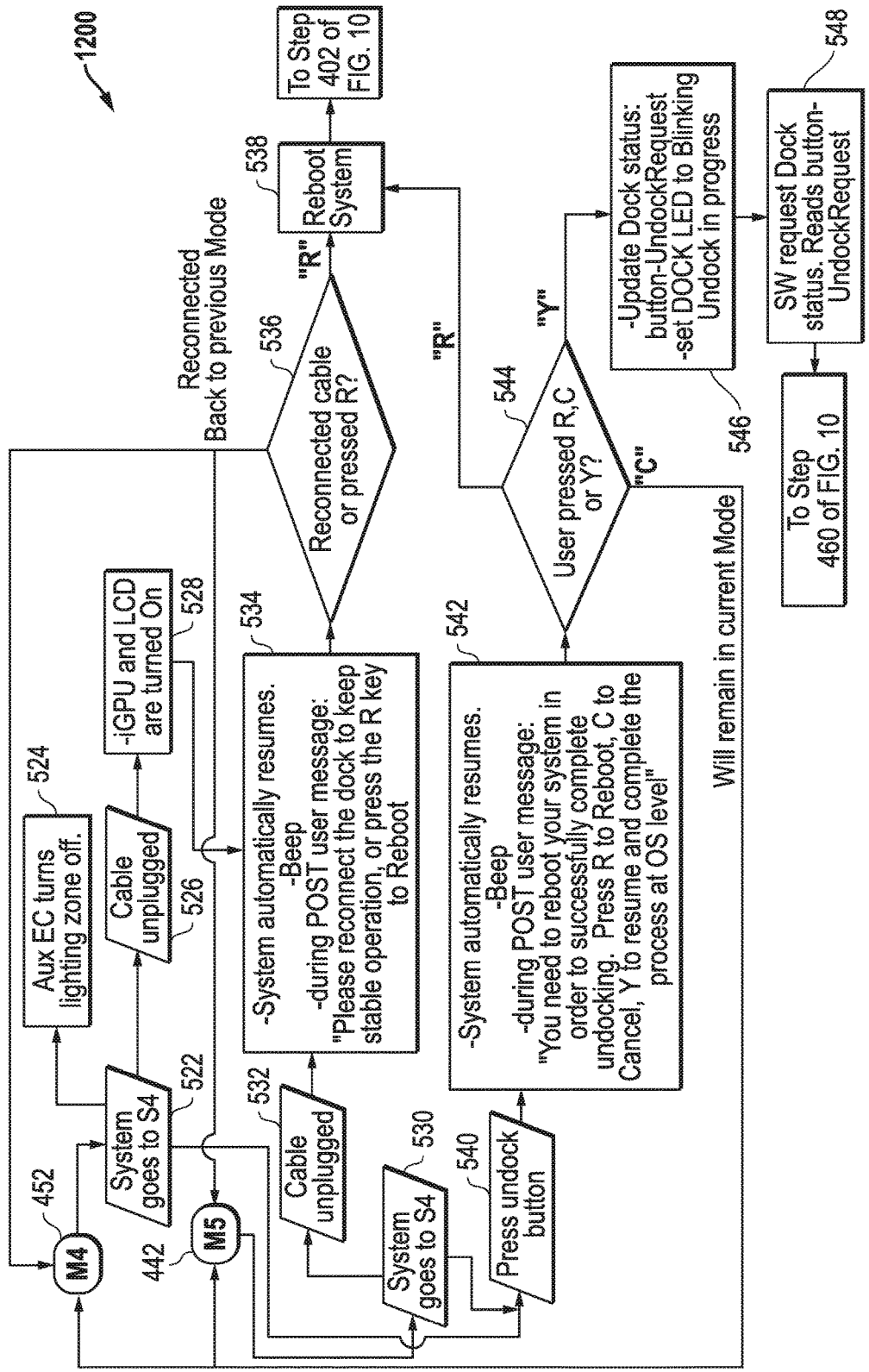
FIG. 12 illustrates a flow chart for external graphics orchestration according to one exemplary embodiment of the disclosed systems and methods.

FIG. 12 illustrates one exemplary embodiment of methodology 1200 that may be implemented in Advanced Configuration and Power Interface (ACPI) system "HIBERNATE" power state S4 for graphics orchestration for an information handling system 100 that has been operating in docked mode 4 or docked mode 5 with cable 101 connected. As shown, at step 522, information handling system 100 enters a S4 hibernation power state from external graphics only (dual GPU-based xGPU) mode 4 of step 452, in which case auxiliary EC 111 turns lighting zone off in step 524. In step 526 dock 180 is undocked by unplugging cable 101 (without user undocking signal), and system BIOS 202 may respond in step 528 by turning on both iGPU 109 and integrated display 125. System BIOS 202 may then automatically resume operation in step 534 and during POST may cause a beep on speaker 119 and display an optional user message such as a "Please reconnect the dock to keep stable operation, or press the R key to Reboot". BIOS 202 may then determine in step 536 whether the cable 101 has been reconnected or a reboot command such as keystroke (e.g., "R") has been entered by the user. If cable 101 has been reconnected, then system 100 returns to previous mode 4 as shown. However, if user enters a reboot command, then system 100 reboots in step 538 and goes to step 402 of FIG. 10.

Returning to S4 state of step 522 of FIG. 12, a user may also provide an undocking signal such as by pressing an undocking button 397 in step 540, in which case BIOS 202 may then automatically resume operation in step 542 and during POST may cause beep on speaker 119 and display an optional user message such as "You need to reboot your system in order to successfully complete undocking. Press R to Reboot, C to Cancel, Y to resume and complete the process at OS level." BIOS 202 may then determine in step 544 whether the user entered keystroke R, C or Y or other command to specify reboot, cancel or resume operations. If user entered a reboot command in step 544, then methodology 1200 proceeds to step 538 previously described. If user enters cancel command in step 544, then methodology 1200 returns remains in current mode (mode 4 state of step 452 or mode 5 of step 442 as may be appropriate). However, if user enters the resume to OS command in step 544, then methodology 1200 proceeds to step 546 where BIOS 202 updates the dock status to: button-UndockRequest, and sets the optional lighting in cable undock buttons 397 to a blinking state to indicate that undocking is in progress. Then in step 548, orchestration application 324 requests current dock status and reads the user requested undock status of: button-UndockRequest. Methodology 1200 the goes to step 460 of FIG. 10 previously described.

Still referring to FIG. 12, at step 530 information handling system 100 enters a S4 hibernation power state from internal/external graphics mode 5. At this time docked system 180 may be undocked in step 532 by unplugging cable 101 (without user undocking signal) in which case methodology 1200 proceeds to step 534 previously described. Alternatively, docked system 180 may be undocked by user undocking signal in step 540 as previously described.

It will be understood that the methodology of FIGS. 10-12 is exemplary only, and that fewer, additional and/or alternative steps may be performed in any order suitable for implementing the orchestration of external graphics, e.g., with switchable graphics capability. Moreover, where particular illustrated steps of FIG. 10-12 refer to switching mux 182 of FIG. 1A to enable particular GPU connectivity, it will be understood that similar steps may be performed for the system embodiment of 1B without mux switching, e.g., utilizing CPU 105 of FIG. 1B to itself establish connectivity to I-dGPU 120 or xGPU 183 as appropriate for the given step.

It will also be understood that one or more of the tasks, functions, or methodologies described herein (e.g., including those described herein for components 103, 105, 109, 111, 120, 183, etc.) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program comprising instructions are configured when executed (e.g., executed on a processing device of an information handling system such as CPU, controller, microcontroller, processor, microprocessor, FPGA, ASIC, or other suitable processing device) to perform one or more steps of the methodologies disclosed herein. A computer program of instructions may be stored in or on the non-transitory computer-readable medium accessible by an information handling system for instructing the information handling system to execute the computer program of instructions. The computer program of instructions may include an ordered listing of executable instructions for implementing logical functions in the information handling system. The executable instructions may comprise a plurality of code segments operable to instruct the information handling system to perform the methodology disclosed herein. It will also be understood that one or more steps of the present methodologies may be employed in one or more code segments of the computer program. For example, a code segment executed by the information handling system may include one or more steps of the disclosed methodologies.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A method of orchestrating external graphics for an information handling system, comprising:
 operating a host information handling system with multiple internal graphics components comprising an integrated graphics processing unit (iGPU) of the host processing device and an internal discrete graphics processing unit (I-dGPU) coupled to the host processing device;
 operating at least the I-dGPU of the host processing device in an on condition to display video on at least one integrated display device or first external display device coupled to a host processing device of the host information handling system;
 using the host processing device of the host information handling system to execute an operating system (OS) system and system BIOS of the information handling system;
 using the host processing device of the host information handling system to execute the system BIOS to detect the presence of an external graphics card (xGPU) of an external docking system temporarily coupled in signal communication with the host information handling system, the xGPU card including at least one external GPU;

using the host processing device of the host information handling system to execute the system BIOS to perform the following steps only after detection of the connected xGPU card:
  leaving on or turning on the I-dGPU of the host information handling system, and
  turning on the xGPU card of the external docking system; and
then operating the I-dGPU and xGPU card in simultaneous on condition to display video on at least one of the integrated display device, first external display device, or at least one second external display device coupled to the external docking system.

2. The method of claim 1, further comprising using the host processing device of the host information handling system to execute the system BIOS to detect the absence of an external graphics card (xGPU) of the external docking system temporarily coupled in signal communication with the host information handling system; and then:
  using the host processing device of the host information handling system to execute the system BIOS to perform the following step only after detection of the absence of a connected xGPU card:
    leaving on or turning on at least the I-dGPU of the host information handling system, and
    operating at least the I-dGPU of the host processing device in an on condition to display video on at least one integrated display device or first external display device coupled to a host processing device of the host information handling system.

3. The method of claim 1, further comprising:
using the host processing device of the host information handling system to execute the system BIOS to perform the following steps only after detection of the connected dual xGPU card:
  leaving on or turning on the iGPU of the host information system and leaving on or turning on the I-dGPU of the host information handling system, and
  turning on the xGPU card of the external docking system; and
then operating the i-GPU, I-dGPU and xGPU card in simultaneous on condition to display video on at least one of the integrated display device, first external display device, or at least one second external display device coupled to the external docking system.

4. The method of claim 3, further comprising using the host processing device to execute switchable graphics drivers to operate each of the iGPU, I-dGPU and xGPU card to selectably display video from different applications executing on the host processing device on at least one of the integrated display device, first external display device, or at least one second external display device coupled to the external docking system.

5. The method of claim 4, further comprising using the host processing device to execute the switchable graphics drivers to only use a user-designated one of the iGPU, I-dGPU or xGPU card to display video from a given application executing on the host processing device on at least one of the integrated display device, first external display device, or at least one second external display device according to a whitelist designation for the given application that is configured by a user of the information handling system.

6. The method of claim 4, further comprising using the host processing device to execute the switchable graphics drivers to:

only use a user-designated one of the iGPU or I-dGPU card to display video from a given application executing on the host processing device on at least one of the integrated display device prior to the step of detecting the presence of the xGPU card connected to the host information handling system; and
only use a user-designated one of the iGPU or xGPU card to display video from a given application executing on the host processing device on at least one of the integrated display device after the step of detecting the presence of the xGPU card connected to the host information handling system.

7. The method of claim 1, further comprising:
operating the i-GPU and I-dGPU components of the host information handling system in simultaneous on condition to display video on the at least one integrated display device or first external display device coupled to the host processing device of the host information handling system;
using the host processing device of the host information handling system to execute the system BIOS to perform the following steps only after detection of the connected dual xGPU card:
  leaving on or turning on each of the i-GPU and the I-dGPU of the host information handling system, and
  turning on the xGPU card of the external docking system; and
then operating the i-GPU, I-dGPU and xGPU card in simultaneous on condition to display video on at least one of the integrated display device, first external display device, or at least one second external display device coupled to the external docking system.

8. The method of claim 7, further comprising using the host processing device of the host information handling system to execute the system BIOS to detect the absence of an external graphics card (xGPU) of the external docking system temporarily coupled in signal communication with the host information handling system; and then:
using the host processing device of the host information handling system to execute the system BIOS to perform the following step only after detection of the absence of a connected xGPU card:
  leaving on or turning on each of the i-GPU and the I-dGPU of the host information handling system; and
operating the i-GPU and I-dGPU components of the host information handling system in simultaneous on condition to display video on the at least one integrated display device or first external display device coupled to the host processing device of the host information handling system.

9. The method of claim 1, further comprising:
operating only the I-dGPU component of the host information handling system in on condition to display video on the at least one integrated display device or first external display device coupled to the host processing device of the host information handling system;
using the host processing device of the host information handling system to execute the system BIOS to perform the following steps only after detection of the connected dual xGPU card:
  leaving on or turning on the I-dGPU of the host information handling system and turning on the i-GPU of the host information handling system, and
  turning on the xGPU card of the external docking system; and then operating the i-GPU, I-dGPU and xGPU card in simultaneous on condition to display video on at least one of the integrated display device, first external display device, or at least one second external display device coupled to the external docking system.

10. The method of claim 9, further comprising using the host processing device of the host information handling system to execute the system BIOS to detect the absence of an external graphics card (xGPU) of the external docking system temporarily coupled in signal communication with the host information handling system; and then:
using the host processing device of the host information handling system to execute the system BIOS to perform the following steps only after detection of the absence of a connected xGPU card:
turning off the iGPU of the host information handling system, and
leaving on or turning on the I-dGPU of the host information handling system; and
then operating the I-dGPU in on condition to display video on at least one of the integrated display device or first external display device.

11. The method of claim 1, further comprising operating the I-GPU and the xGPU card in simultaneous on condition after the system BIOS detects the presence of the xGPU card connected to the host information handling system to display video on at least one second external display device directly coupled to the external docking system, the external docking system being coupled between the information handling system and the second external display device.

12. An information handling system, comprising:
a host processing device configured to execute a host operating system (OS) and a system BIOS of the information handling system;
at least one integrated display device or first external display device coupled to the host processing device; and
multiple internal graphics components including an integrated graphics processing unit (iGPU) of the host processing device and an internal discrete graphics processing unit (I-dGPU) coupled to the host processing device, the multiple internal graphics components being coupled to the at least one integrated display device or first external display device and being configured to operate in a simultaneous on condition to display video on the at least one integrated display device, first external display device, or at least one second external display device coupled to an external docking system;
where the host processing device of the host information handling system is configured to execute the system BIOS to detect the presence of an external graphics card (xGPU) of the external docking system temporarily coupled in signal communication with the host information handling system, the xGPU card including at least one external GPU;
where the host processing device of the host information handling system is further configured to execute the system BIOS to perform the following steps only after detection of the connected xGPU card:
leaving on or turning on the I-dGPU of the host information handling system, and
turning on the xGPU card of the external docking system; and
where at least one processing device of the information handling system is configured to then operate the I-dGPU and the xGPU card in simultaneous on condition to display video on at least one of the integrated display device, first external display device, or at least one second external display device coupled to the external docking system.

13. The system of claim 12, where the host processing device of the host information handling system is further configured to execute the system BIOS to detect the absence of an external graphics card (xGPU) of the external docking system temporarily coupled in signal communication with the host information handling system; and
where the host processing device of the host information handling system is configured to then execute the system BIOS to perform the following step only after detection of the absence of a connected xGPU card:
leaving on or turning on at least the I-dGPU of the host information handling system; and
where at least one processing device of the information handling system is configured to then operate at least the I-dGPU of the host information handling system in an on condition to display video on the at least one integrated display device or first external display device coupled to the host processing device of the host information handling system.

14. The system of claim 12, where the host processing device of the host information handling system is configured to execute the system BIOS to perform the following steps only after detection of the connected dual xGPU card:
leaving on or turning on the iGPU of the host information handling system and leaving on or
turning on the I-dGPU of the host information handling system; and
turning on the xGPU card of the external docking system; and
where at least one processing device of the information handling system is configured to then operate the i-GPU, I-dGPU and xGPU card in simultaneous on condition to display video on at least one of the integrated display device, first external display device, or at least one second external display device coupled to the external docking system.

15. The system of claim 14, where the host processing device is configured to execute switchable graphics drivers to operate each of the iGPU, I-dGPU and xGPU card to selectably display video from different applications executing on the host processing device on at least one of the integrated display device, first external display device, or at least one second external display device coupled to the external docking system.

16. The system of claim 15, where the host processing device is configured to execute the switchable graphics drivers to only use a user-designated one of the iGPU, I-dGPU or xGPU card to display video from a given application executing on the host processing device on at least one of the integrated display device, first external display device, or at least one second external display device according to a whitelist designation for the given application that is configured by a user of the information handling system.

17. The system of claim 15, where the host processing device is configured to execute the switchable graphics drivers to:
only use a user-designated one of the iGPU or I-dGPU card to display video from a given application executing on the host processing device on at least one of the integrated display device prior to the step of detecting the presence of the xGPU card connected to the host information handling system; and only use a user-designated one of the iGPU or xGPU card to display video from a given application executing on the host processing device on at least one of the integrated display device after the step of detecting the presence of the xGPU card connected to the host information handling system.

18. The system of claim 12, where the information handling system is configured to operate the i-GPU and I-dGPU components of the host information handling system in simultaneous on condition to display video on the at least one integrated display device or first external display device coupled to the host processing device of the host information handling system; and where the host processing device of the host information handling system is configured to execute the system BIOS to perform the following steps only after detection of the connected dual xGPU card:
   leaving on or turning on each of the i-GPU and the I-dGPU of the host information handling system, and turning on the xGPU card of the external docking system; and
   where at least one processing device of the information handling system is configured to then operate the i-GPU, I-dGPU and xGPU card in simultaneous on condition to display video on at least one of the integrated display device, first external display device, or at least one second external display device coupled to the external docking system.

19. The system of claim 18, where the host processing device of the host information handling system is further configured to execute the system BIOS to detect the absence of an external graphics card (xGPU) of the external docking system temporarily coupled in signal communication with the host information handling system; and where the host processing device of the host information handling system is configured to then execute the system BIOS to perform the following step only after detection of the absence of a connected xGPU card:
   leaving on or turning on each of the i-GPU and the I-dGPU of the host information handling system; and
   where at least one processing device of the information handling system is configured to then operate the i-GPU and I-dGPU components of the host information handling system in simultaneous on condition to display video on the at least one integrated display device or first external display device coupled to the host processing device of the host information handling system.

20. The system of claim 12, where the
   where at least one processing device of the information handling system is configured to operate only the I-dGPU component of the host information handling system in an on condition to display video on the at least one integrated display device or first external display device coupled to the host processing device of the host information handling system;
   where the host processing device of the host information handling system is configured to execute the system BIOS to perform the following steps only after detection of the connected dual xGPU card:
      leaving on or turning on the I-dGPU of the host information handling system and turning on the i-GPU of the host information handling system, and turning on the xGPU card of the external docking system; and
   where at least one processing device of the information handling system is configured to then operate the i-GPU, I-dGPU and xGPU card in simultaneous on condition to display video on at least one of the integrated display device, first external display device, or at least one second external display device coupled to the external docking system.

21. The system of claim 20, where the host processing device of the host information handling system is configured to:
   execute the system BIOS to detect the absence of an external graphics card (xGPU) of the external docking system temporarily coupled in signal communication with the host information handling system; and
   then execute the system BIOS to perform the following steps only after detection of the absence of a connected xGPU card:
      turning off the iGPU of the host information handling system, and
      leaving on or turning on the I-dGPU of the host information handling system; and
   where at least one processing device of the information handling system is configured to then operate the I-dGPU in on condition to display video on at least one of the integrated display device or first external display device.

22. The system of claim 12, where at least one processing device of the information handling system is configured to operate the I-GPU and the xGPU card in simultaneous on condition after the system BIOS detects the presence of the xGPU card connected to the host information handling system to display video on at least one second external display device directly coupled to the external docking system, the external docking system being coupled between the information handling system and the second external display device.

* * * * *